United States Patent
Palmeri et al.

(10) Patent No.: US 8,838,833 B2
(45) Date of Patent: *Sep. 16, 2014

(54) PROVIDING ON-DEMAND ACCESS TO SERVICES IN A WIDE AREA NETWORK

(75) Inventors: Ron Palmeri, Berkeley, CA (US); Stephen Reade, Mill Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/753,709

(22) Filed: Apr. 2, 2010

(65) Prior Publication Data

US 2010/0235445 A1    Sep. 16, 2010

Related U.S. Application Data

(63) Continuation of application No. 11/016,566, filed on Dec. 16, 2004, now Pat. No. 7,725,605.

(60) Provisional application No. 60/599,394, filed on Aug. 6, 2004.

(51) Int. Cl.
  *G06F 15/16* (2006.01)
  *G06F 17/30* (2006.01)
  *G06Q 10/06* (2012.01)
  *H04L 29/08* (2006.01)

(52) U.S. Cl.
  CPC .......... *G06F 17/30566* (2013.01); *G06Q 10/06* (2013.01); *H04L 67/02* (2013.01)
  USPC .......................................... 709/246; 709/223

(58) Field of Classification Search
  USPC ................. 709/201, 203, 229, 231, 249, 250; 707/106
  See application file for complete search history.

(56) References Cited

U.S. PATENT DOCUMENTS 5,005,200 A    4/1991  Fischer
5,119,377 A    6/1992  Cobb et al.

(Continued)

FOREIGN PATENT DOCUMENTS

WO    WO0046732    * 8/2000    ............. G06F 19/00

OTHER PUBLICATIONS

US Office Action dated Sep. 21, 2004 issued in U.S. Appl. No. 10/727,089 (7,305,454).

(Continued)

*Primary Examiner* — Ninos Donabed
(74) *Attorney, Agent, or Firm* — Haynes Beffel & Wolfeld LLP; Ernest J. Beffel, Jr.

(57) ABSTRACT

An integration services network is described which is operable to facilitate access to a composite service by a plurality of users having associated client machines. Each of the users is associated with one of a plurality of independent enterprises. At least one data store has a directory stored therein which maps an identity for each of the users to a policy framework which defines access information relating to a plurality of services. At least one computing device is operable to set up the composite service by integrating operation of the plurality of services. The plurality of services are associated with and controlled by a plurality of independent service providers. The at least one computing device is further operable to connect with the client machines and each of the services, and to selectively facilitate interaction among the client machines and the services with reference to the directory and the policy framework, thereby enabling each of the users to access the plurality of services as an integrated solution.

23 Claims, 14 Drawing Sheets

(56) References Cited

U.S. PATENT DOCUMENTS

| | | | |
|---|---|---|---|
| 5,157,726 A | 10/1992 | Merkle et al. | |
| 5,159,630 A | 10/1992 | Tseng et al. | |
| 5,222,234 A | 6/1993 | Wang et al. | |
| 5,224,166 A | 6/1993 | Hartman, Jr. | |
| 5,255,389 A | 10/1993 | Wang | |
| 5,311,438 A | 5/1994 | Sellers et al. | |
| 5,333,312 A | 7/1994 | Wang | |
| 5,513,323 A | 4/1996 | Williams et al. | |
| 5,557,798 A | 9/1996 | Skeen et al. | |
| 5,715,450 A | 2/1998 | Ambrose et al. | |
| 5,784,566 A | 7/1998 | Viavant et al. | |
| 5,790,677 A | 8/1998 | Fox et al. | |
| 5,812,669 A | 9/1998 | Jenkins et al. | |
| 5,821,937 A | 10/1998 | Tonelli et al. | |
| 5,826,017 A | 10/1998 | Holzmann | |
| 5,831,610 A | 11/1998 | Tonelli et al. | |
| 5,850,518 A | 12/1998 | Northrup | |
| 5,873,096 A | 2/1999 | Lim et al. | |
| 5,903,652 A | 5/1999 | Mital | |
| 5,918,159 A | 6/1999 | Fomukong et al. | |
| 5,941,945 A | 8/1999 | Aditham et al. | |
| 5,963,953 A | 10/1999 | Cram et al. | |
| 6,032,118 A | 2/2000 | Tello et al. | |
| 6,049,785 A | 4/2000 | Gifford | |
| 6,055,513 A | 4/2000 | Katz et al. | |
| 6,065,082 A | 5/2000 | Blair et al. | |
| 6,072,942 A | 6/2000 | Stockwell et al. | |
| 6,073,142 A | 6/2000 | Geiger et al. | |
| 6,091,714 A | 7/2000 | Sensel et al. | |
| 6,092,083 A | 7/2000 | Brodersen et al. | |
| 6,115,744 A | 9/2000 | Robins et al. | |
| 6,125,391 A | 9/2000 | Meltzer et al. | |
| 6,148,290 A | 11/2000 | Dan et al. | |
| 6,148,411 A | 11/2000 | Ichinohe et al. | |
| 6,169,534 B1 | 1/2001 | Raffel et al. | |
| 6,178,425 B1 | 1/2001 | Brodersen et al. | |
| 6,184,823 B1 * | 2/2001 | Smith et al. | 342/357.31 |
| 6,189,011 B1 | 2/2001 | Lim et al. | |
| 6,216,130 B1 * | 4/2001 | Hougaard et al. | 707/805 |
| 6,216,135 B1 | 4/2001 | Brodersen et al. | |
| 6,226,623 B1 | 5/2001 | Schein et al. | |
| 6,230,203 B1 | 5/2001 | Koperda et al. | |
| 6,233,565 B1 | 5/2001 | Lewis et al. | |
| 6,233,617 B1 | 5/2001 | Rothwein et al. | |
| 6,243,747 B1 | 6/2001 | Lewis et al. | |
| 6,256,667 B1 | 7/2001 | Wanghlander et al. | |
| 6,260,062 B1 | 7/2001 | Davis et al. | |
| 6,266,669 B1 | 7/2001 | Brodersen et al. | |
| 6,269,380 B1 | 7/2001 | Terry et al. | |
| 6,272,457 B1 * | 8/2001 | Ford et al. | 704/9 |
| 6,292,789 B1 | 9/2001 | Schutzer | |
| 6,295,530 B1 | 9/2001 | Ritchie et al. | |
| 6,304,969 B1 | 10/2001 | Wasserman et al. | |
| 6,324,568 B1 | 11/2001 | Diec et al. | |
| 6,324,693 B1 | 11/2001 | Brodersen et al. | |
| 6,332,163 B1 | 12/2001 | Bowman-Amuah | |
| 6,336,135 B1 | 1/2002 | Niblett et al. | |
| 6,336,137 B1 | 1/2002 | Lee et al. | |
| 6,338,050 B1 | 1/2002 | Conklin et al. | |
| 6,343,290 B1 * | 1/2002 | Cossins et al. | 1/1 |
| 6,351,739 B1 | 2/2002 | Egendorf | |
| D454,139 S | 3/2002 | Feldcamp et al. | |
| 6,356,529 B1 | 3/2002 | Zarom | |
| 6,367,077 B1 | 4/2002 | Brodersen et al. | |
| 6,389,533 B1 | 5/2002 | Davis et al. | |
| 6,393,442 B1 | 5/2002 | Cromarty et al. | |
| 6,393,605 B1 | 5/2002 | Loomans | |
| 6,397,197 B1 | 5/2002 | Gindlesperger | |
| 6,397,254 B1 | 5/2002 | Northrup | |
| 6,405,220 B1 | 6/2002 | Brodersen et al. | |
| 6,421,705 B1 | 7/2002 | Northrup | |
| 6,425,119 B1 | 7/2002 | Jones et al. | |
| 6,434,550 B1 | 8/2002 | Warner et al. | |
| 6,434,628 B1 | 8/2002 | Bowman-Amuah | |
| 6,438,594 B1 | 8/2002 | Bowman-Amuah | |
| 6,446,089 B1 | 9/2002 | Brodersen et al. | |
| 6,449,634 B1 | 9/2002 | Capiel | |
| 6,463,460 B1 | 10/2002 | Simonoff | |
| 6,470,357 B1 | 10/2002 | Garcia, Jr. et al. | |
| 6,470,385 B1 | 10/2002 | Nakashima et al. | |
| 6,473,770 B1 * | 10/2002 | Livshutz et al. | 701/414 |
| 6,493,758 B1 | 12/2002 | McLain | |
| 6,499,108 B1 | 12/2002 | Johnson | |
| 6,526,044 B1 | 2/2003 | Cookmeyer et al. | |
| 6,529,489 B1 | 3/2003 | Kikuchi et al. | |
| 6,538,673 B1 | 3/2003 | Maslov | |
| 6,546,413 B1 | 4/2003 | Northrup | |
| 6,549,908 B1 | 4/2003 | Loomans | |
| 6,549,944 B1 | 4/2003 | Weinberg et al. | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,578,076 B1 | 6/2003 | Putzolu | |
| 6,587,466 B1 | 7/2003 | Bhattacharya et al. | |
| 6,587,838 B1 | 7/2003 | Esposito et al. | |
| 6,601,082 B1 | 7/2003 | Durham et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,633,630 B1 | 10/2003 | Owens et al. | |
| 6,636,889 B1 | 10/2003 | Estrada et al. | |
| 6,643,650 B1 | 11/2003 | Slaughter et al. | |
| 6,651,087 B1 | 11/2003 | Dennis | |
| 6,665,393 B1 | 12/2003 | Johnson et al. | |
| 6,665,648 B2 | 12/2003 | Brodersen et al. | |
| 6,665,655 B1 | 12/2003 | Warner et al. | |
| 6,671,695 B2 | 12/2003 | McFadden | |
| 6,671,713 B2 | 12/2003 | Northrup | |
| 6,671,746 B1 | 12/2003 | Northrup | |
| 6,684,214 B2 | 1/2004 | Bata et al. | |
| 6,684,438 B2 | 2/2004 | Brodersen et al. | |
| 6,704,768 B1 | 3/2004 | Zombek et al. | |
| 6,711,565 B1 | 3/2004 | Subramaniam et al. | |
| 6,714,987 B1 | 3/2004 | Amin et al. | |
| 6,718,380 B1 | 4/2004 | Mohaban et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,735,621 B1 | 5/2004 | Yoakum et al. | |
| 6,754,681 B2 | 6/2004 | Brodersen et al. | |
| 6,763,104 B1 | 7/2004 | Judkins et al. | |
| 6,763,351 B1 | 7/2004 | Subramaniam et al. | |
| 6,768,904 B2 | 7/2004 | Kim | |
| 6,782,383 B2 | 8/2004 | Subramaniam et al. | |
| 6,789,077 B1 | 9/2004 | Slaughter et al. | |
| 6,804,330 B1 | 10/2004 | Jones et al. | |
| 6,813,278 B1 | 11/2004 | Swartz et al. | |
| 6,823,522 B1 * | 11/2004 | Lamb | 719/316 |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,850,979 B1 | 2/2005 | Saulpaugh et al. | |
| 6,857,072 B1 | 2/2005 | Schuster et al. | |
| 6,868,143 B1 | 3/2005 | Menon et al. | |
| 6,868,401 B1 | 3/2005 | Carpenter et al. | |
| 6,868,447 B1 | 3/2005 | Slaughter et al. | |
| 6,874,011 B1 | 3/2005 | Spielman et al. | |
| 6,877,023 B1 | 4/2005 | Maffeis et al. | |
| 6,885,736 B2 | 4/2005 | Uppaluru | |
| 6,886,026 B1 | 4/2005 | Hanson | |
| 6,892,376 B2 | 5/2005 | McDonald et al. | |
| 6,898,618 B1 | 5/2005 | Slaughter et al. | |
| 6,917,962 B1 | 7/2005 | Cannata et al. | |
| 6,917,976 B1 | 7/2005 | Slaughter et al. | |
| 6,918,084 B1 | 7/2005 | Slaughter et al. | |
| 6,925,488 B2 | 8/2005 | Bantz et al. | |

(56) References Cited

U.S. PATENT DOCUMENTS

| | | |
|---|---|---|
| 6,925,595 B1 | 8/2005 | Whitledge et al. |
| 6,934,532 B2 | 8/2005 | Coppinger et al. |
| 6,948,063 B1 | 9/2005 | Ganesan et al. |
| 6,950,875 B1 | 9/2005 | Slaughter et al. |
| 6,952,717 B1 | 10/2005 | Monchilovich et al. |
| 6,961,760 B2 | 11/2005 | Li et al. |
| 6,965,878 B1 | 11/2005 | Heuring |
| 6,980,993 B2 | 12/2005 | Horvitz et al. |
| 6,988,274 B2 * | 1/2006 | Machin et al. ............... 719/328 |
| 6,990,513 B2 | 1/2006 | Belfiore et al. |
| 7,007,032 B1 | 2/2006 | Chen et al. |
| 7,013,426 B1 | 3/2006 | Ingersoll |
| 7,028,312 B1 | 4/2006 | Merrick et al. |
| 7,035,202 B2 | 4/2006 | Callon |
| 7,047,488 B2 | 5/2006 | Ingersoll et al. |
| 7,072,983 B1 | 7/2006 | Kanai et al. |
| 7,082,532 B1 | 7/2006 | Vick et al. |
| 7,088,727 B1 | 8/2006 | Short et al. |
| 7,099,950 B2 | 8/2006 | Jones et al. |
| 7,100,195 B1 | 8/2006 | Underwood |
| 7,127,613 B2 | 10/2006 | Pabla et al. |
| 7,152,204 B2 | 12/2006 | Upton |
| 7,219,223 B1 | 5/2007 | Bacchus et al. |
| 7,225,460 B2 | 5/2007 | Barzilai et al. |
| 7,249,176 B1 | 7/2007 | Salas et al. |
| 7,249,195 B2 | 7/2007 | Panec |
| 7,254,614 B2 | 8/2007 | Mulligan et al. |
| 7,305,454 B2 | 12/2007 | Reese et al. |
| 7,340,508 B1 | 3/2008 | Kasi et al. |
| 7,363,650 B2 | 4/2008 | Moriconi et al. |
| 7,448,046 B2 | 11/2008 | Navani et al. |
| 7,454,750 B2 * | 11/2008 | Fitts et al. ............... 718/100 |
| 7,458,018 B2 | 11/2008 | Jones et al. |
| 7,496,649 B2 | 2/2009 | Lee, IV et al. |
| 7,516,191 B2 | 4/2009 | Brouk et al. |
| 7,546,629 B2 | 6/2009 | Albert et al. |
| 7,574,511 B2 | 8/2009 | Pujol et al. |
| 7,590,685 B2 | 9/2009 | Palmeri et al. |
| 7,644,170 B2 | 1/2010 | Clarke et al. |
| 7,689,711 B2 | 3/2010 | Brouk et al. |
| 7,703,008 B2 | 4/2010 | Ingersoll et al. |
| 7,725,605 B2 * | 5/2010 | Palmeri et al. ............... 709/246 |
| 7,739,351 B2 | 6/2010 | Shkvarchuk et al. |
| 7,802,007 B2 | 9/2010 | Reese |
| 8,271,541 B2 * | 9/2012 | Mohan et al. ............... 707/803 |
| 8,683,321 B2 | 3/2014 | Ingersoll et al. |
| 2001/0005358 A1 | 6/2001 | Shiozawa |
| 2001/0029478 A1 | 10/2001 | Laster et al. |
| 2001/0044791 A1 | 11/2001 | Richter et al. |
| 2002/0013854 A1 | 1/2002 | Eggleston et al. |
| 2002/0019797 A1 | 2/2002 | Stewart et al. |
| 2002/0029201 A1 | 3/2002 | Barzilai et al. |
| 2002/0038336 A1 | 3/2002 | Abileah et al. |
| 2002/0058277 A1 | 5/2002 | Bathe et al. |
| 2002/0059425 A1 | 5/2002 | Belfiore et al. |
| 2002/0072951 A1 | 6/2002 | Lee et al. |
| 2002/0082892 A1 | 6/2002 | Raffel |
| 2002/0087371 A1 | 7/2002 | Abendroth |
| 2002/0091533 A1 | 7/2002 | Ims et al. |
| 2002/0103878 A1 * | 8/2002 | Moncibais ............... 709/217 |
| 2002/0103881 A1 * | 8/2002 | Granade et al. ............... 709/218 |
| 2002/0116454 A1 | 8/2002 | Dyla et al. |
| 2002/0129352 A1 | 9/2002 | Brodersen et al. |
| 2002/0138166 A1 | 9/2002 | Mok et al. |
| 2002/0140731 A1 | 10/2002 | Subramaniam et al. |
| 2002/0143997 A1 | 10/2002 | Huang et al. |
| 2002/0161611 A1 | 10/2002 | Price et al. |
| 2002/0162090 A1 | 10/2002 | Parnell et al. |
| 2002/0165742 A1 | 11/2002 | Robins |
| 2002/0169803 A1 | 11/2002 | Sampath et al. |
| 2002/0194181 A1 | 12/2002 | Wachtel |
| 2002/0194227 A1 | 12/2002 | Day et al. |
| 2003/0004971 A1 | 1/2003 | Gong |
| 2003/0018705 A1 | 1/2003 | Chen et al. |
| 2003/0018808 A1 | 1/2003 | Brouk et al. |
| 2003/0018830 A1 | 1/2003 | Chen et al. |
| 2003/0033191 A1 | 2/2003 | Davies et al. |
| 2003/0041178 A1 | 2/2003 | Brouk et al. |
| 2003/0046583 A1 | 3/2003 | Goldman et al. |
| 2003/0050800 A1 | 3/2003 | Brandt et al. |
| 2003/0053459 A1 | 3/2003 | Brouk et al. |
| 2003/0058277 A1 | 3/2003 | Bowman-Amuah |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0079029 A1 | 4/2003 | Garimella et al. |
| 2003/0079047 A1 * | 4/2003 | Fitts et al. ............... 709/310 |
| 2003/0097447 A1 | 5/2003 | Johnston |
| 2003/0115179 A1 | 6/2003 | Prabakaran et al. |
| 2003/0120675 A1 | 6/2003 | Stauber et al. |
| 2003/0126136 A1 | 7/2003 | Omoigui |
| 2003/0144860 A1 | 7/2003 | Casati et al. |
| 2003/0151633 A1 | 8/2003 | George et al. |
| 2003/0159136 A1 | 8/2003 | Huang et al. |
| 2003/0163726 A1 | 8/2003 | Kidd |
| 2003/0187921 A1 | 10/2003 | Diec et al. |
| 2003/0189600 A1 | 10/2003 | Gune et al. |
| 2003/0191816 A1 | 10/2003 | Landress et al. |
| 2003/0204427 A1 | 10/2003 | Gune et al. |
| 2003/0206192 A1 | 11/2003 | Chen et al. |
| 2003/0208505 A1 | 11/2003 | Mullins et al. |
| 2003/0225730 A1 | 12/2003 | Warner et al. |
| 2004/0001092 A1 | 1/2004 | Rothwein et al. |
| 2004/0010489 A1 | 1/2004 | Rio t al. |
| 2004/0015981 A1 | 1/2004 | Coker et al. |
| 2004/0019696 A1 | 1/2004 | Scott et al. |
| 2004/0027388 A1 | 2/2004 | Berg et al. |
| 2004/0054690 A1 * | 3/2004 | Hillerbrand et al. ........ 707/104.1 |
| 2004/0078373 A1 | 4/2004 | Ghoneimy et al. |
| 2004/0117358 A1 * | 6/2004 | von Kaenel et al. ............... 707/3 |
| 2004/0117428 A1 | 6/2004 | Surma et al. |
| 2004/0128001 A1 | 7/2004 | Levin et al. |
| 2004/0162741 A1 | 8/2004 | Flaxer et al. |
| 2004/0162918 A1 | 8/2004 | Freidman et al. |
| 2004/0167986 A1 | 8/2004 | Gilfix et al. |
| 2004/0167987 A1 | 8/2004 | Reese |
| 2004/0186860 A1 | 9/2004 | Lee et al. |
| 2004/0186891 A1 | 9/2004 | Panec et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0205216 A1 | 10/2004 | Ballinger et al. |
| 2004/0243574 A1 | 12/2004 | Giroux et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0039040 A1 | 2/2005 | Ransom et al. |
| 2005/0050555 A1 | 3/2005 | Exley et al. |
| 2005/0071266 A1 | 3/2005 | Eder |
| 2005/0080914 A1 | 4/2005 | Lerner et al. |
| 2005/0086297 A1 | 4/2005 | Hinks et al. |
| 2005/0086360 A1 * | 4/2005 | Mamou et al. ............... 709/232 |
| 2005/0086594 A1 | 4/2005 | Schlimmer et al. |
| 2005/0091098 A1 | 4/2005 | Brodersen et al. |
| 2005/0138210 A1 | 6/2005 | Shkvarchuk et al. |
| 2005/0166209 A1 | 7/2005 | Merrick et al. |
| 2005/0198121 A1 * | 9/2005 | Daniels et al. ............... 709/203 |
| 2005/0204048 A1 | 9/2005 | Pujol et al. |
| 2005/0228863 A1 * | 10/2005 | Palmeri et al. ............... 709/205 |
| 2005/0234928 A1 | 10/2005 | Shkvarchuk et al. |
| 2005/0256934 A1 | 11/2005 | Motoyama |
| 2006/0015353 A1 | 1/2006 | Reese |
| 2006/0021019 A1 | 1/2006 | Hinton et al. |
| 2006/0031225 A1 | 2/2006 | Palmeri et al. |
| 2006/0069717 A1 | 3/2006 | Mamou et al. |
| 2006/0074703 A1 | 4/2006 | Bhandarkar |
| 2006/0173951 A1 | 8/2006 | Arteaga et al. |
| 2007/0078950 A1 | 4/2007 | Hopkins et al. |

(56) References Cited

U.S. PATENT DOCUMENTS

2008/0052775 A1    2/2008   Sandhu et al.
2008/0184265 A1    7/2008   Kasi et al.
2009/0019534 A1    1/2009   Bakshi et al.
2010/0041380 A1    2/2010   Hewes et al.
2010/0205522 A1    8/2010   Ingersoll et al.
2010/0223301 A1    9/2010   Shkvarchuk et al.
2010/0235445 A1    9/2010   Palmeri et al.
2011/0060842 A1    3/2011   Reese

OTHER PUBLICATIONS

US Office Action dated Jun. 2, 2005 issued in U.S. Appl. No. 10/727,089 (7,305,454).
US Office Action Final dated Nov. 28, 2005 issued in U.S. Appl. No. 10/727,089 (7,305,454).
US Office Action dated Jul. 3, 2006 issued in U.S. Appl. No. 10/727,089 (7,305,454).
US Office Action Final dated Jan. 17, 2007 issued in U.S. Appl. No. 10/727,089 (7,305,454).
US Office Notice of Allowance dated Jun. 29, 2007 issued in U.S. Appl. No. 10/727,089 (7,305,454).
US Office Action dated Sep. 21, 2004 issued in U.S. Appl. No. 10/728,356 (7,249,195).
US Office Action dated Jun. 6, 2005 issued in U.S. Appl. No. 10/728,356 (7,249,195).
US Office Action final dated Sep. 30, 2005 issued in U.S. Appl. No. 0/728,356 (7,249,195).
US Office Action dated May 24, 2006 issued in U.S. Appl. No. 10/728,356 (7,249,195).
US Notice of Allowance dated May 21, 2007 issued in U.S. Appl. No. 10/728,356 (7,249,195).
US Office Action dated Mar. 26, 208 issued in U.S. Appl. No. 10/742,513.
US Office Action dated Feb. 5, 2008 issued in U.S. Appl. No. 10/820,650.
US Office Action dated Oct. 28, 2008 issued in U.S. Appl. No. 10/820,650.
US Notice of Allowance dated Mar. 13, 2009 issued in U.S. Appl. No. 10/820,650.
US Notice of Allowance dated Jun. 18, 2009 issued in U.S. Appl. No. 10/820,650.
US Office Action dated Dec. 14, 2004 issued in U.S. Appl. No. 09/820,966.
US Office Action Final dated May 19, 2005 issued in U.S. Appl. No. 09/820,966.
US Office Action dated Jun. 20, 2005 issued in U.S. Appl. No. 09/820,966.
US Office Action Final dated Sep. 30, 2005 issued in U.S. Appl. No. 09/820,966.
US Office Action dated Jul. 3, 2006 issued in U.S. Appl. No. 09/820,966.
US Office Action Final dated Apr. 18, 2007 issued in U.S. Appl. No. 09/820,966.
US Office Action dated Aug. 27, 2007 issued in U.S. Appl. No. 09/820,966.
US Office Action Final dated Apr. 16, 2008 issued in U.S. Appl. No. 09/820,966.
US Office Action dated Jan. 9, 2009 issued in U.S. Appl. No. 09/820,966.
US Notice of Allowance dated Nov. 16, 2009 issued in U.S. Appl. No. 09/820,966.
US Office Action dated Feb. 9, 2005 issued in U.S. Appl. No. 09/820,964.
US Office Action Final dated Jul. 13, 2005 issued in U.S. Appl. No. 09/820,964.
US Advisory Action dated Sep. 20, 2005 issued in U.S. Appl. No. 09/820,964.
US Office Action dated Dec. 28, 2005 issued in U.S. Appl. No. 09/820,964.
US Office Action Final dated Jun. 27, 2006 issued in U.S. Appl. No. 09/820,964.
US Advisory Action dated Nov. 20, 2006 issued in U.S. Appl. No. 09/820,964.
US Office Action dated Jan. 25, 2007 issued in U.S. Appl. No. 09/820,964.
US Office Action Final dated Jul. 10, 2007 issued in U.S. Appl. No. 09/820,964.
US Advisory Action dated Sep. 20, 2007 issued in U.S. Appl. No. 09/820,964.
US Office Action dated Dec. 27, 2007 issued in U.S. Appl. No. 09/820,964.
US Office Action Final dated Sep. 3, 2008 issued in U.S. Appl. No. 09/820,964.
US Office Action dated Mar. 30, 2009 issued in U.S. Appl. No. 09/820,964.
US Examiner Interview Summary dated Jul. 24, 2009 issued in U.S. Appl. No. 09/820,964.
US Office Action Final dated Nov. 12, 2009 issued in U.S. Appl. No. 09/820,964.
US Office Action dated Oct. 26, 2004 issued in U.S. Appl. No. 09/820,965.
US Office Action dated Jun. 6, 2005 issued in U.S. Appl. No. 09/820,965.
US Office Action Final dated Sep. 28, 2005 issued in U.S. Appl. No. 09/820,965.
US Examiner's Interview Summary dated Aug. 3, 2005 issued in U.S. Appl. No. 09/820,965.
US Office Action dated Jun. 14, 2006 issued in U.S. Appl. No. 09/820,965.
US Office Action dated Dec. 28, 2006 issued in U.S. Appl. No. 09/820,965.
US Office Action Final dated Jul. 11, 2007 issued in U.S. Appl. No. 09/820,965.
US Examiner Interview Summary dated Oct. 9, 2007 issued in U.S. Appl. No. 09/820,965.
US Office Action dated Dec. 28, 2007 issued in U.S. Appl. No. 09/820,965.
US Notice of Allowance and Examiner's Amendment dated Sep. 8, 2008 issued in U.S. Appl. No. 09/820,965.
US Notice of Allowance dated Dec. 18, 2008 issued in U.S. Appl. No. 09/820,965.
US Office Action dated Jan. 22, 2009 issued in U.S. Appl. No. 09/820,965.
US Office Action dated Feb. 3, 2009 issued in U.S. Appl. No. 09/820,965.
US Office Action dated Feb. 12, 2009 issued in U.S. Appl. No. 09/820,965.
US Office Action dated Feb. 25, 2009 issued in U.S. Appl. No. 09/820,965.
US Office Action dated Feb. 2, 2009 issued in U.S. Appl. No. 11/016,566.
US Office Action Final dated Jul. 15, 2009 issued in U.S. Appl. No. 11/016,566.
US Notice of Allowance date Dec. 24, 2009 issued in U.S. Appl. No. 11/016,566.
US Office Action dated Aug. 31, 2009 issued in U.S. Appl. No. 11/021,716.
US Examiner Interview Summary dated Dec. 2, 2009 issued in U.S. Appl. No. 11/021,716.
US Office Action Final dated Mar. 4, 2010 issued in U.S. Appl. No. 11/021,716.
BizTalk Framework Overview (2000) downloaded from Biztalk.org website at http://www.biztalk.org/Biztalk/framework.asp; Retrieved from internet on Nov. 8, 2000, 3 pages.
Coblist: -Cob: Welcome to my photo album!(2000) retrieved from internet at http://www.deatech.com/natural/coblist/coblist-we/2000/0484.html; dated Sep. 25, 2000, pp. 1-2.
CrossGAIN: A New Foundation for the Web (2000), overview downloaded from Crossgain.com website at http://www.crossgain.com; Retrieved from internet on Sep. 22, 2000, 1 page.

(56) References Cited

OTHER PUBLICATIONS

CrossWeave™—Extending the Enterprise (2001), company overview downloaded from CrossWeave.com website at http://www.crossweave.com/company_overview.html; Retrieved from internet on Apr. 1, 2002, 1 page.

ebXML: Creating a Single Global Electronic Market (2000) Oasis Un Cefact, copyright ebXML 2000, ebXML Technical Architecture Team, Oct. 17, 2000, 46 pages.

"Evite.com Launches Free Web-based Group Activity Organizer," retrieved from the Internet at www.proquest.com, *PR Newswire*, ProQuest Doc. ID: 43258854, Jul. 19, 1999, pp. 1-2.

"Evite Relies on MySQL to Deliver Millions of Invitations," retrieved from www.mysql.com, *My SQL, The World's Most Popular Open Source Database*, MySQL.com, 1998, 4 pages.

"Evite Tour," Mar. 2001, retrieved from the Internet at http://web/archive.org/web/20010270736l7/www.evite.com/tour?printAll+ok, Evite Mar. 2001, pp. 1-9.

"Excite©Home: Excite's #1 webshots provides users with comprehensive photo capabilities; Unveiling "My Photos" where Excite users can create personal albums, share photos, search photos and order quality prints by Ofoto," [Retrieved from internet at www.proquest.com, on May 24, 2005] ProQuest Doc. ID: 54811626, Jorgensen, M2 Presswire, Coventry: Jun. 5, 2000, 3 pages.

Festa, Paul (2000) "Start-up gains Netscape funding, Microsoft engineers,"CNET News.com, dated Sep. 10, 2000 downloaded from CNET.com website at http://news.com.com/2100-1017-245521.html; Retrieved from internet on Apr. 1, 2002, 2 pages.

Fu, Michael C. (2001) "Simulation Optimization", *Proceedings of the 2001 Winter Simulation Conference*, pp. 53-61.

GlueCode: Our Mission and Vision (2002) downloaded from Gluecode.com website at URL:http://www.gluecode.com/company/mission_vision.html, P.1 Retrieved from internet on Apr. 1, 2002, 1 page.

Gluecode™ (2000), Company overview and product guide downloaded from Glucode.com website at http://www.glucode.com; Retrieved from internet on Sep. 22, 2000, 18 pages.

Grand, Mark (1993) MIME Overview, downloaded from Mindspring.com website at http://www.mindspring.com/~mgrand/mime.html; Revised Oct. 26, 1993; Retrieved from internet on Mar. 1, 2001, 13 pages.

Greef, Arthur (1998) "Partner Interface Technical Architecture, " RosettaNet/PIP Technical Adventure.doc dated Apr. 1, 2002, pp. 1-12.

Greenbaum, Joshua (2000) "Next Generation E-Business Trading Networks: Intelligent Hubs and Viquity's Nexus Solution," Enterprise Applications Consulting, Berkeley, CA (www.eaconsult.com), pp. 1-20.

ipo.com—Venture Portfolio Company Profile (2002), downloaded from ipo.com website at http://www.ipo.com/venture/ pcprofile.asp?p=IPO&pc=20323 Retrieved from internet on Apr. 1, 2002, 1 page.

LaQuey, Robert E. (1999), "SML: Simplifying XML," retrieved from Internet at www.XML.com, dated Nov. 24, 1999, pp. 1-6.

Maria, Anu (1997) "Introduction to Modeling and Simulation", *Proceedings of the 1997 Winter Simulation Conference*, pp. 7-13.

Moberg, Dale and Drummond, Rik (2005) "Mime-Based Secure Peer-to-Peer Business Data Interchange Using HTTP, Applicability Statement 2 (AS2)"; Network Working Group, Request for Comments: 4130, Category: Standards Track, Copyright, The Internet Society, Jul. 2005, 47 pages.

Seppanen, Marvin S. (2000) "Developing Industrial Strength Simulation Models Using Visual Basic for Applications (VBA)" *Proceedings of the 2000 Winter Simulation Conference*, pp. 77-82.

Slam Dunk Networks (2000), Company overview and product guide downloaded from Slamdunknetworks.com website at http://www.slamdunknetworks.com; Retrieved from internet on Sep. 22, 2000, 15 pages.

Slam Dunk Networks$^{SM}$: A global Infrastructure for the Guaranteed Delivery of B2B Transactions over the Internet, Copyright 2000 Slam Dunk Networks, Inc., 19 pages.

Stross, Kenner (2000) "Managed B2B Infrastructure Technical Architecture," Jul. 31, 2000, Transactplus™ business quality internet, Transact Technical Architecture, pp. 1-14.

Takus, David A. (1997) "Arena® Software Tutorial" *Proceedings of the 1997 Winter Simulation Conference*, pp. 541-544.

"Trails.com Teams Up With Evite to Offer Email Trip Planning Service," retrieved from Internet at www.trails.com, *Homes*, 2000.

TransactPlus Network (2000), Company overview and product guide downloaded from TransactPlus.com website at http://www.transactplus.com; Retrieved from internet on Sep. 22, 2000, 13 pages.

Viquity Dynamic Commerce Network™ (DCN) (2000), Company Overview and Service Description downloaded from Viquity.com website at http://www.viquity.com/solutions/architecture.html; Retrieved from internet on Sep. 22, 2000, 2 pages.

Viquity Press Release (2000) "Viquity Demonstrates Power of Hub Technology in ebXML Proof-of-Concept," dated Dec. 12, 2000, downloaded from Viquity.com website at http://www.viquity.com/news_events/pr_detail.asp. Retrieved from internet on Apr. 1, 2002, 2 pages.

Open Applications Group White Paper Document No. 20010301, Best Practices and XML Content for eBusiness and Application Integration, OAGIS Extensions Release 1.1, 2001,pp. 1-34 (36pgs). cited by other.

Cabrera, Felipe et al. "Specification: Web Services Transaction (WS-Transaction)", Aug. 9, 2002, 33pages, http://www.ibm.com/developerworks/library/ws-transpec. cited by examiner.

\* cited by examiner

PROVIDING ON-DEMAND ACCESS TO SERVICES IN A WIDE AREA NETWORK

RELATED APPLICATION DATA

The present application is a continuation of and claims priority under 35 U.S.C. §120 to commonly assigned U.S. patent application Ser. No. 11/016,566 for PROVIDING ON-DEMAND ACCESS TO SERVICES IN A WIDE AREA NETWORK filed on Dec. 16, 2004, which claims priority under 35 U.S.C. 119(e) to U.S. Provisional Patent Application No. 60/599,394 for METHODS AND APPARATUS FOR PROVIDING ON-DEMAND ACCESS TO SERVICES IN A WIDE AREA NETWORK filed on Aug. 6, 2004, the entire disclosures of both of which are incorporated herein by reference for all purposes. The present application is also related to U.S. patent application Ser. No. 09/820,964 for SYSTEM AND METHOD FOR MAPPING OF SERVICES filed Mar. 30, 2001, U.S. patent application Ser. No. 09/820,965 (now issued as U.S. Pat. No. 7,516,191) for SYSTEM AND METHOD FOR INVOCATION OF SERVICES filed Mar. 30, 2001, U.S. patent application Ser. No. 09/820,966 for SYSTEM AND METHOD FOR ROUTING MESSAGES BETWEEN APPLICATIONS filed Mar. 30, 2001, U.S. patent application Ser. No. 10/727,089 (now issued as U.S. Pat. No. 7,305,454) for APPARATUS AND METHODS FOR PROVISIONING SERVICES filed Dec. 2, 2003, U.S. patent application Ser. No. 10/728,356 (now issued as U.S. Pat. No. 7,249,195) for APPARATUS AND METHODS FOR CORRELATING MESSAGES SENT BETWEEN SERVICES filed Dec. 3, 2003, and U.S. patent application Ser. No. 10/742,513 for APPARATUS AND METHODS FOR MEDIATING MESSAGES filed Dec. 19, 2003, the entire disclosures of all of which are incorporated herein by reference for all purposes.

BACKGROUND OF THE INVENTION

The present invention relates to techniques for providing interoperability between and among disparate entities, applications and services in a network environment. More specifically, embodiments of the invention provide techniques which provide on-demand access to different combinations of applications and/or services in such a network environment.

Corporate reliance on technology has become more complex and pervasive. Increasingly, companies are identifying opportunities to extend their core business or cut costs using the Internet. Both trends have put increasing priority on integrating the operation of disparate business applications that exist in different enterprises. As a result, the enterprise application integration (EAI) and business-to-business B2B industries have emerged to provide solutions for unifying enterprise legacy systems that may span corporate boundaries and may include the applications of business partners and customers. Ideally, this unification does not require sweeping changes to the underlying applications and data structures.

EAI and B2B solution providers typically offer end point solutions for managing business process interactions between end points. This can take place within an enterprise on a local network or, in the case of B2B, across the Internet. Although a specific enterprise software package may be designed to transparently handle diverse business processes carried out by two or more end nodes, each specific enterprise software package requires releasing, implementing or building customized connectors or adapters to connect to different legacy systems which will work for the specific business processes and applications used by the specific end nodes. As a result, these enterprise solutions are not easily scalable. Additionally, scores of connectors are needed for each vendor (e.g., Oracle, SAP and Peoplesoft). As each supplier releases new versions of their software, EAI and B2B vendors find themselves unable to gain traction under the burden of supporting existing connecters.

Notwithstanding the benefits of EAI and B2B solutions, the software costs and resource investments required often prevent small-to-medium enterprise (SME) customers from embracing EAI and B2B solutions. For SMEs, reliance on web services technology providers represents an increasingly attractive alternative.

The application service provider (ASP) market is one of the fastest growing segments of the software industry. ASPs make enterprise applications (e.g., human resources administration, recruiting, travel and expense management, sales force automation) available to customers over the web on a subscription basis. These applications are fully managed and hosted by the provider providing significant cost savings to enterprises and eliminating many of the issues requiring EAI solutions.

Some ASPs merely host and manage third-party packaged software for their customers (i.e., "managed hosters"). Others build new applications from the ground up to take advantage of the benefits and cost-savings of the ASP model. ASPs enjoy the profit margins and operational scalability of consumer Web companies like eBay and Yahoo, while at the same time offering the feature sets of complex enterprise software applications such as PeopleSoft and Siebel.

Although the ASP approach allows a business and its partners to use third party or custom applications, this approach does not allow the configuring and dismantling of complex arrangements between business partners. Specifically, the ASP approach requires custom configurations when business partners use different data formats for their messages or different communications protocols. Using these custom configurations, business partners specify the format of outgoing messages to comport with the recipient's format requirements. These messages can then be delivered to a recipient in a format understandable to the recipient. According to this approach, business entities must keep track of formatting and integration requirements of each of their recipient business partners in order to achieve interoperability. This can be costly and time-consuming.

None of these ad hoc approaches to interoperability can practically provide a single solution for facilitating the consumption of the wide array of disparate services employed by the typical enterprise. Moreover, none of these approaches is well suited to deliver such an array of services in the personalized manner to which so many users of the World Wide Web have become accustomed.

In view of the above, there is a need for facilitating communications between and among diverse business entities, processes, and services in a scalable manner.

SUMMARY OF THE INVENTION

According to the present invention, an interoperability network is provided which mediates technology issues between disparate entities communicating via the network. According to a specific embodiment, an integration services network is provided which is operable to facilitate access to a composite service by a plurality of users having associated client machines. Each of the users is associated with one of a plurality of independent enterprises. At least one data store has a directory stored therein which maps an identity for each of the users to a policy framework which defines access information relating to a plurality of services. At least one computing device is operable to set up the composite service by integrating operation of the plurality of services. The plurality of services are associated with and controlled by a plurality of independent service providers. The at least one computing device is further operable to connect with the client machines and each of the services, and to selectively facilitate interaction among the client machines and the services with reference to the directory and the policy framework, thereby enabling each of the users to access the plurality of services as an integrated solution.

According to another embodiment, a computer-implemented method for facilitating access to a composite service by a plurality of users having associated client machines is provided. Each of the users is associated with one of a plurality of independent enterprises. Access is provided to a network having a directory associated therewith which maps an identity for each of the users to a policy framework. The policy framework defines access information relating to a plurality of services associated with the network. The network also has the composite service associated therewith, operation of the plurality of services having been integrated to enable the composite service. The services are associated with and controlled by a plurality of independent service providers. The client machines are enabled to connect with the network and selectively interact with the services in accordance with the directory and the policy framework, thereby enabling each of the users to access the plurality of services as an integrated solution.

A further understanding of the nature and advantages of the present invention may be realized by reference to the remaining portions of the specification and the drawings.

DETAILED DESCRIPTION OF SPECIFIC EMBODIMENTS

Figure 1:
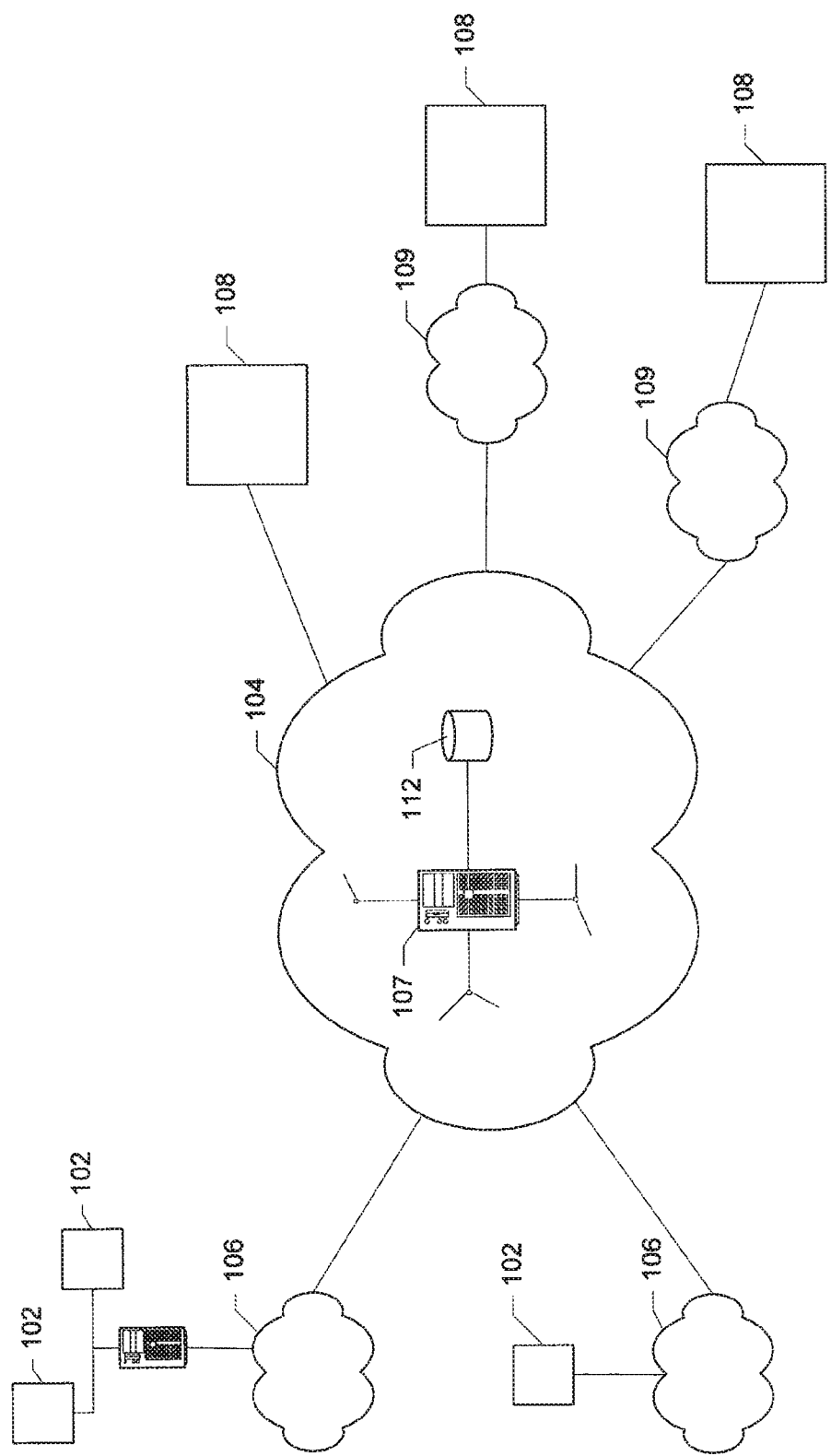
FIG. 1 is a simplified network diagram of a network environment in which embodiments of the present invention may be practiced.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention are implemented in an interoperability network which is a message platform having a loosely coupled, service oriented architecture (SOA). One of the main advantages of such an architecture is that it allows communication (e.g., the consumption of services) between network end points and processes to transcend technology or protocol mediation issues. An end point, e.g., a user, or a process, e.g., a service, simply connects to the network and that one connection implicitly connects that end point or process (at some level) to every other entity on the network.

As used herein, the term "service" may represent any computer application, process, entity, or device accessible to other applications, processes, entities, or devices through an interface such as an application programming interface (API), user interface, or Internet web user interface by any of a variety of protocols over a network within an entity or over the Internet. A service may also comprise multiple methods or applications on a single device or distributed across multiple devices.

According to various specific embodiments of the invention, an interoperability network is provided which facilitates interoperability using a wide variety of Web Services technologies and standards including, for example, SOAP, Web Services Description Language (WSDL), WS-Security, WS-Policy, and Business Process Execution Language (BPEL). The interoperability network mediates the technology differences in data formats, communications protocols and business policies through a set of established and defined processes and policies.

In general, the term Web Services refers to a collection of technology standards which enable software applications of all types to communicate over a network. A Web Service typically facilitates a connection between two applications or services in which queries and responses are exchanged in XML over HTTP. More specifically, the term Web Services implies the implementation of a stack of specific, complementary standards.

Although not specifically tied to any transport protocol, Web services build on Internet connectivity and infrastructure to ensure nearly universal reach and support. In particular, Web services take advantage of HTTP, the same connection protocol used by Web servers and browsers. XML is a widely accepted format for exchanging data and its corresponding semantics. It is a fundamental building block for nearly every other layer in the Web Services stack.

The Simple Object Access Protocol (SOAP) is a protocol for messaging between applications. It is based on XML and uses common Internet transport protocols like HTTP to carry its data. Web Services Description Language (WSDL) is an XML-based description of how to connect to and communicate with a particular Web service. A WSDL description abstracts a particular service's various connection and messaging protocols into a high-level bundle and forms a key element of the UDDI directory's service discovery model. Finally, Universal Description, Discovery, and Integration (UDDI) represents a set of protocols and a public directory for the registration and real-time lookup of Web services and other business processes. Various embodiments of the invention employ these and similar technologies.

Referring now to the exemplary diagram of FIG. 1, user platforms 102 (which may be part of an enterprise network) connect with a interoperability network 104 via intervening networks 106. Interoperability network 104 (e.g., using one or more computing devices such as server 107) facilitates access to selected ones of associated services 108 which may be sponsored or provided by network 104, or may comprise application services from third parties. These services may actually reside in the network or be connected via intervening networks (e.g., 109). As mentioned above, network 104 provides transparent connections to and interoperability with a wide variety of services and applications. Interoperability network 104 has a directory capability (represented by database 112) which facilitates management of user identities (e.g., including role and group membership), application service identities, and policies which control which entities in the network can interact, and the manner in which they can interact.

According to some implementations, the interoperability network employs the directory to manage interactions among the services associated with many independent organizations, each with different access, authentication and encryption technologies. Differences in organizational security policies are handled using a policy framework which mediates the differences. According to some embodiments, each organization is able to configure and enforce access rights with multiple methods of authentication being supported.

According to some implementations, the interoperability network supports WS-Policy, a flexible mechanism which enables enterprises to govern access to the services they have deployed on the interoperability network. Such a mechanism may be employed, for example, to ensure that data are exchanged over encrypted connections to the interoperability network, that user and service identities are verified (using the directory), and that access to a particular service is limited and controlled. According to various implementations, such capabilities are supported using industry standards such as, for example, SSL, IPSEC VPNs, and X.509 digital certificates.

Thus, interoperability network 104 provides a hosted, open, and shareable environment in which related and unrelated entities may provide and consume services using heterogeneous technology.

One approach to facilitating connection to and the consumption of services via such an interoperability network involves separating the messaging function into two different aspects, message delivery and message posting. Message delivery relates to how messages are delivered from the network to a service and requires only that the service provider specify how the service expects to receive messages, i.e., the message format and communication protocol. Message posting relates to how, depending on its type, a service is required to post messages to the network and identify services to be consumed. By decoupling these two aspects of messaging, a consumer of a service need only be able to identify the service to be consumed for the network to successfully mediate the interaction.

Additional examples of computer networks in which the techniques of the present invention may be implemented are described in the copending patent applications incorporated herein by reference above. However, it should be understood that the networks described herein and in these copending applications are merely exemplary and not meant to limit the scope of the present invention.

The present invention is generally related to techniques for providing on-demand access to combinations of services within a computer network such as, for example, the interoperability network described above or the networks described in the above-referenced patent applications. Several of these embodiments are described below as being implemented within an interoperability network which may also be referred to as "Grand Central." Grand Central provides an interoperability network which allows users to set up or register multiple entities to share information, applications, and services efficiently and reliably. It should be noted that the details relating to the Grand Central network are not intended to limit the scope of the invention. Rather, any suitable interoperability network may be enhanced according to the techniques described herein. It should also be noted that any of the features specified in the above referenced patent applications may be integrated and used with the techniques of the present invention.

The Integrated Application Suite (IAS) solution implemented according to specific embodiments of the invention enables the effective deployment, aggregation, integration, and maintenance of any combination of the various services, applications and tools available on an interoperability network. According to such embodiments, a powerful, cost effective ASP solution with all applications seamlessly integrated, is delivered in an on-demand model. The IAS solution provides fully integrated suites of business tools and applications, and enables an easy to use, yet powerful set of system capabilities including the auto-provisioning of application and tool suites, all of which may be "pre-wired" with the necessary adapters, connectors, and integrated critical business processes.

The various elements of the IAS solution are aggregated and integrated by the interoperability network platform. The interoperability network enables the effective aggregation, distribution, and integration of business processes of both data and services. All of the required registrations, provisioning, synchronization, and reconciliation are accomplished, maintained, and monitored via the network.

The IAS solution allows small business to have access to integrated business processes that are delivered as a service. These business processes enable such businesses to have a single integrated view into standard business tools that can be deployed seamlessly across their enterprise. In addition, the integrated applications and corresponding business processes delivered by the IAS solution reduce the amount of data entry and other duplicated activities, thus ensuring greater efficiencies and fewer errors. Because the entire solution is delivered as a service, the small business has no hardware and software to manage, purchase, or maintain, thereby significantly reducing costs.

Figure 2:
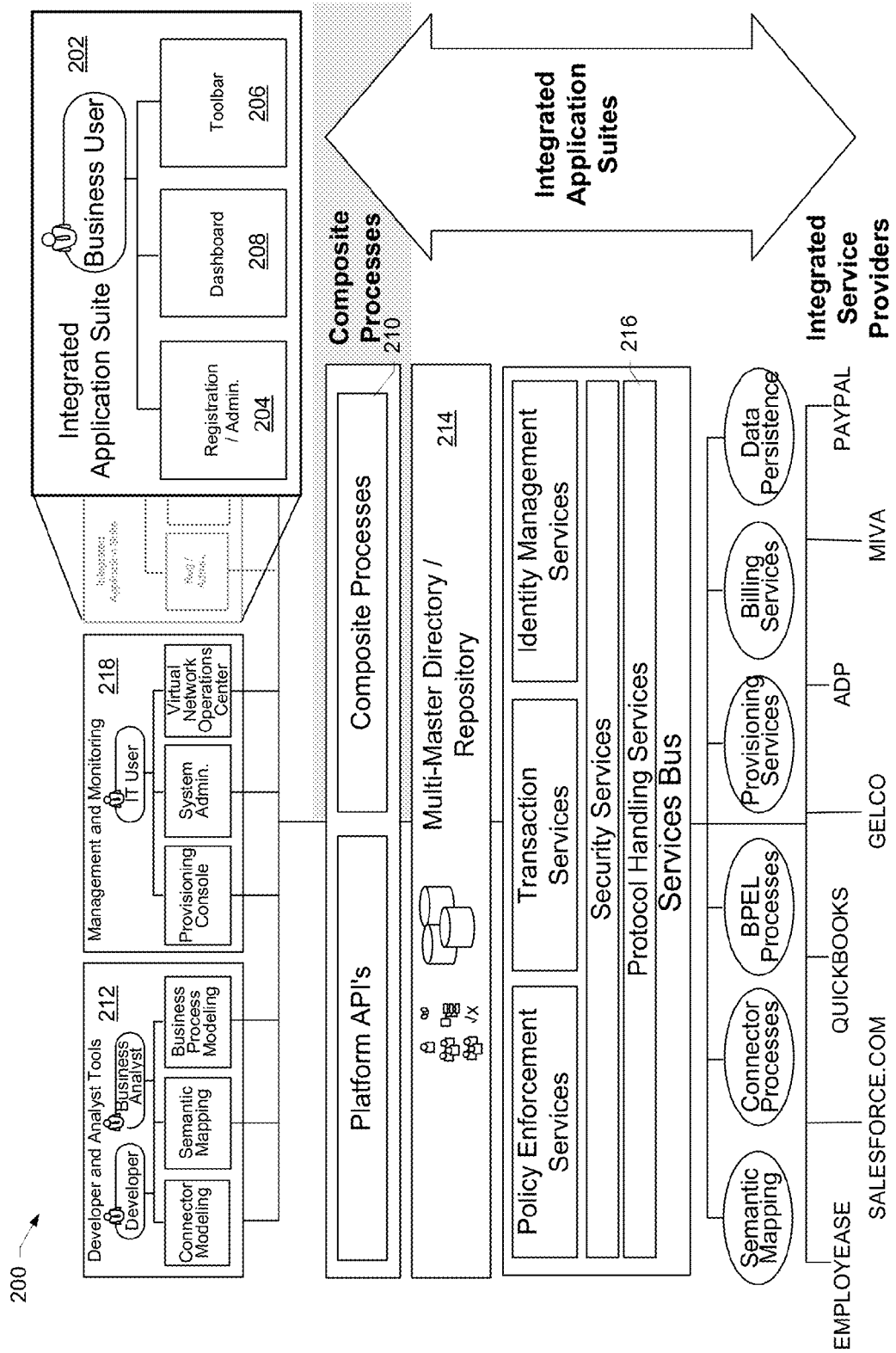
FIG. 2 is a simplified block diagram of an interoperability network according to a specific embodiment of the invention.

According to a specific embodiment illustrated in FIG. 2, the components of the Integrated Application Suite (IAS) solution 202 include a Registration and Administration Portal (RAP) 204, an IAS Toolbar 206, an IAS Dashboard 208, and Composite Processes 210, all deployed in and enabled by an Interoperability Network 200.

The RAP is the first interface that a prospective user encounters and facilitates signing-up the user and establishing the initial relationship. It may include any of the following: service provider branding, registration pages, service package selections, payment management, documentation on particular IAS offerings, support information, etc. The RAP also includes a link for download of the IAS Toolbar.

By using the RAP, users of composite services will be able to establish an identity on the network and select business applications from pre-defined packages. This identity is propagated to the selected enterprise applications. For each package selected, there is a stated System of Record (SOR). The SOR is used via its standard web interface to enter initial user or corporate information. This information will be delivered and replicated to the other applications by the IAS solution. All other updates to the SOR from that point on are propagated in a similar fashion.

In order to simplify access to the IAS solution, the IAS Toolbar (which is deployable from a link in the RAP) may be installed on the user's web browser. This toolbar performs several functions including, for example, Single Sign-On (SSO) of the user for enterprise applications, single-click access to native web interfaces for enterprise applications, IAS Dashboard launch, administration mode (allows configuration of SSO and toolbar configuration, and various ancillary functions (e.g., search, help etc.).

The IAS Dashboard is launched from the IAS Toolbar and provides a web browser environment for initiating composite processes from a palette of predefined services and composite processes. These will form the "pre-plumbed" aspect of the IAS solution, and provide a library of business functions that span multiple enterprise applications from the selected package. By using these composite processes, the user will enter required information into the IAS Dashboard and the composite process will perform the dissemination of "messages" to the associated systems. The interoperability network performs all the complex integration requirements on demand, such as mediation of security, format, protocol, and enables the transformation, orchestration, and delivery of all "messages" included in the composite processes for all applications. The IAS Dashboard may also incorporate service provider branding, role-based content presentation (general user, administration, etc.), diagnostic reporting (based on services executed), and application administration and help pages.

According to a specific embodiment, the interoperability network provides the functional and data integration capabilities, as well as business process engines, security management, directory services and graphical interface support. Hence, all the complexity of connecting a "many to many" environment is handled by defining the application on the interoperability network one time. According to some embodiments, the IAS solution employs a "rich client" infrastructure. This is a downloadable web browser plug-in that supports the interoperability network and permits graphical components to interact with the services and processes deployed on the network.

For development purposes, a rich client provides a development environment (e.g., environment 212), which also runs from within a browser as an automatically downloadable plug-in.

The IAS solution eases integration between systems by moving the complexity usually required at the edge into the network. This allows simple connections, with the network taking care of interoperability between each node. The network adapts to the communications protocols and data formats used by customer applications so that minimal additional software is required at the customer site. Using this loosely coupled approach, the interoperability network is able to "on-board" customers in a matter of minutes or hours instead of the weeks and months it can take to conduct traditional integration products with software and hardware.

The IAS solution may be implemented in the interoperability network described above. Additional characteristics of a specific interoperability network in which an embodiment of the IAS solution may be implemented will now be described. It should be noted that embodiments of the invention may be implemented in networks which do not include all of the characteristics and functionalities described. Rather, the details of the following description are only being provided by way of example.

A powerful, shared directory 214 lies at the heart of the interoperability network which enables disparate entities to easily discover, access, reuse and share services and business processes in the network. The Business Services Directory simplifies and accelerates the creation and extension of Business Solutions. The public directory of services enables services to be categorized (e.g., by category and provider) and published so that they can easily be woven into solutions. Any third party can easily expand the reach of their services by publishing them in the directory. A private directory of services provides comprehensive access control on an individual user, role, or group basis.

Differences in technology implementations such as connectivity standards and data formats are mediated by the interoperability network in contrast with the conventional approach of "hardwiring" them. This 'loose-coupling' provides the flexibility for services and applications to change in the future without breaking the solution. The IAS solution can use whatever standards-based technology is preferred today, and very simply migrate to new standards and policies as they emerge. In addition, the network can rapidly and inexpensively react to customer needs and respond to emerging business opportunities with little or no additional investment.

The interoperability network provides secure, reliable messaging, with connectivity options (e.g., protocol handling services 216) that range from traditional file and batch-based systems such as FTP, to evolving standards such as EDI/AS2, XML/HTTP and Web services protocols. A wide range of legacy applications and connectors for existing enterprise systems are supported, as well as web portals, application servers, desktop applications and handheld devices—any software designed for Web services.

The interoperability network provides a comprehensive suite of data mapping network services for mediating differences between data formats. An industry standard XSLT service performs mapping between XML based data formats—with maps being easily created through a wide variety of readily available XML tools.

Security policy mediation in the network ensures that trusted relationships can be managed between many organizations, each with different access, authentication and encryption technologies, without unnecessary exposure of data and applications resident behind corporate firewalls. Differences in corporate security policies are mediated through a policy framework. The solution provider is in complete control of configuring and enforcing access rights, and multiple levels of authentication are supported. A complete permissions model is provided for configuring and enforcing access rights. Authentication methods supported include VeriSign certificates to validate identity of business partners. Connections between enterprises and the interoperability network are secured at 128-bit encryption.

A full suite of on-boarding options simplifies the process of connecting partners and customers, so that valuable time is not lost engaging new business relationships. Each partner can choose the appropriate technology and the preferred connection method.

Automating business processes between applications and services is not a single event, but an ongoing process that can require the orchestration of multiple many-to-many interactions with tens if not hundreds of other organizations. The interoperability network provides a rich, open-standards based process development environment, which enables the creation and deployment of many-to-many business processes in the network. It provides the fundamental building blocks and platform services required to rapidly create, combine, clone and customize business process solutions and share them with others, without having to buy and deploy expensive and complex enterprise software. Commonly used processes and services can be published in the services directory for reuse. Simple and flexible message routing for performing basic process orchestration gives the ability to chain together services from multiple parties to form business processes.

In some implementations, BPEL Version 1.1 is delivered in an open, service-based model, allowing a variety of endpoints to feed into and out of a business process—from traditional EDI or FTP-enabled endpoints, to SOAP-enabled endpoints. Because the BPEL service gains all the benefits of the network's service-based model including it's extensibility, flexibility, visibility and control, the execution of BPEL scripts is done without the need to deploy costly hardware or software within the enterprise.

Message Routes and BPEL services can be wrapped as services and published and shared publicly or privately—providing an open and reusable model for integrating and building business processes between partners. Of course, it will be understood that BPEL is just an example of how business processes may be implemented. Other tools and approaches to business process design may be employed such as, for example, process design tools from Grand Central Communications, Inc. of San Francisco, Calif.

Monitoring, reporting and exception management features (e.g., 218) of the interoperability network improve the quality and scope of services that can be delivered by providing shared context and end-to-end visibility of all business processes that flow through the network. Services can take actions based on real-time events, using event-based notifications combined with business process management tools.

The loosely coupled Services Oriented Architecture of the interoperability network allows changes in connectivity, data format and security choices as well as providing expanded services without negatively impacting other participants. The policy framework ensures that any negative changes (such as a customer or service provider dropping to a lower level security) are trapped and flagged for remediation without compromising the integrity of the interaction.

The interoperability network provides shared visibility into a number of aspects of interactions on the network. Customizable reports on the status and history of any service, business process, or data relationship provides the ability to trace correlated messages and transactions. Event-handling mechanisms can be configured by partners with rules to route a wide range of exceptions.

Alerts can easily be programmed into business processes enabling those processes to effectively operate automatically unless a problem is encountered. Once activated, alerts can be directed to other services on the network, external endpoints for integration into enterprise management systems, or converted to e-mails, pages or faxes.

A unique tracking ID is issued for each interaction spanning individual point to point data exchanges as well as long-lived, multiple message exchanges. Message audit trails and transaction information is collected, persisted and validated to help resolve transaction disputes by providing proof of who sent a message, proof of submission and proof that the message has been given to the intended recipient.

In general, the interoperability network addresses user on-boarding and ongoing management issues by moving mediation and management of connectivity and integration into the network. It is the network that adapts to each enterprise's environment, instead of the enterprise needing to adapt to the network.

A specific embodiment of the IAS solution provides for the offering and subsequent provisioning of integrated application suites. A list of services and the options for consuming them are presented to a potential user in an email or web interface. A link to a Business Solution Center is also presented where the user can choose the integrated application suite they require along with any optional services. Offers can be very detailed, including information on data formats, SLAs, and terms of use in addition to basic service information. When the user accepts the offer, the interoperability network provisions an account, configures any connectors, permissions, services to be consumed, and then enables the user to set security policies.

Conventionally, integration preparedness is limited to either 1) an EAI vendor providing an infrastructure you can work with, or 2) an application vendor exposing APIs for use in integration. Given these two starting points, it is up to the developer to derive a working system and to bear the consequent costs. And yet the effort has often been done before, meaning that the applications of such vendors have been integrated repeatedly with the same problems being encountered and resolved.

To address these issues, embodiments of the invention employ "Pre-Plumbed Applications." That is, using the interoperability network as the EAI infrastructure, the required applications are integrated (function and data) and the resulting services deployed. These services can be combined to form composite services through the use of process definitions which can span multiple integrated applications. These services may then be consumed either programmatically or through the IAS Dashboard.

According to the invention, the interoperability network allows the loose coupling of applications into sets of composite processes. For every class of application that is added, the network creates a "normalized" view of the application within the directory. As an example, with Customer Relationship Management (CRM), although there are several packages capable of doing this, the interactions are standard, for example: add salesperson, delete salesperson, post closed sale to accounting, etc. The interfaces into the applications will be defined and the business processes between them will be a set of standard processes that will require minimal modification when new packages are added.

These processes are controlled either through the applications themselves (if they have the appropriate customization tools available), or through the IAS Dashboard which is customized to the business process that will provide a set of tasks to users with the correct permissions. The IAS Dashboard may be configured to provide business level reports on the interactions between applications, such as:

"Shopping Cart: Sold Item XXXX to customerID XXXX transferred to accounting system on XX/XX/XX at XX:XX"

In addition, the IAS Dashboard may be configured to provide simple escalation rule configuration, e.g. when an error of type X happens, either call, e-mail, page or IM user XXX.

According to a specific embodiment, the interoperability network is operable to leverage, wherever possible, existing and evolving standards to ensure that these business processes conform to the needs of customers. This approach enables customers and service providers to easily extend solutions using a commonly understood, non-proprietary framework. For example, the Universal Business Language is an effort currently being conducted under the auspices of OASIS to simplify business interactions. The purpose of the OASIS UBL Technical Committee is to develop a standard library of XML business documents (e.g., purchase orders, invoices, etc.) by modifying an already existing library of XML schemas to incorporate the best features of other existing XML business libraries. The Technical Commitee will then design a mechanism for the generation of context-specific business schemas through the application of transformation rules to the common UBL source library. UBL is intended to become an international standard for electronic commerce freely available to everyone without licensing or other fees. The interoperability network is designed to take advantage of such developments.

According to specific embodiments, a wide variety of applications and/or services deployed in or accessible via an interoperability network are integrated or bundled in various combinations. Three exemplary combinations corresponding to different suites of services are described below. It will be understood that these are merely examples of the virtually unlimited combinations of services enabled by the present invention.

According to one embodiment, an eCommerce solution is provided which enables individuals and small businesses to quickly and easily set up an online commercial presence. This solution supports scenarios such as completion of eCommerce sales sequences (shopping carts, shipping options, tax calculations and so forth) with sales orders and purchase orders and payment. Online storefront capabilities are provided by Miva Corporation (www.miva.com). Financial management tools, i.e., QuickBooks, are provided by Intuit, Inc. (http://quickbooks.intuit.com/). Online payment processing capabilities are provided by PayPal, Inc. (www.paypal.com).

According to another embodiment, a Customer Relationship Management (CRM) solution is provided for small and medium-sized enterprises (SMEs). In addition to full CRM and financial capabilities, this suite supports end-to-end sales event expense management, as well as the other financial implications of doing business which traditionally impact several systems. In addition to providing the financial management tools of QuickBooks and the storefront capabilities of Miva, this solution provides the CRM tools of Salesforce.com (www.salesforce.com) and the expense management tools of Gelco Information Network, Inc. (www.gelcoexpense.com).

According to yet another embodiment, a Human Resource (HR) management solution is provided which enables SMEs to efficiently manage their human resources and employee benefits. This suite provides a library of predefined processes that impact multiple enterprise applications every day (for example, hiring employees, setting up payroll, change management, etc.). HR management tools are provided by Employease, Inc. (www.employease.com). Payroll processing tools are provided by Automatic Data Processing (ADP), Inc. (www.adp.com). Expense management and financial management tools are provided by Gelco and Intuit, respectively.

The details of integrating with each of the applications or services mentioned above are described below. It should again be noted that these descriptions are provided for exemplary purposes only, and that the present invention is not limited to the identified services, applications, or integration techniques.

Integrating to QuickBooks: Overview

With over 8 million users of the QuickBooks financial management solution, Intuit has released a well-defined Software Development Kit (SDK) which enables integration of QuickBooks with 3$^{rd}$ party systems. The QuickBooks SDK provides a common methodology for integrating an application with QuickBooks regardless of QuickBooks version. At the core of this methodology is qbXML, a version of XML designed for QuickBooks. In addition to the innovation around qbXML, the SDK is compatible with many different development environments.

Developers leveraging the QuickBooks SDK start with a standards-based foundation for creating their integrations. The SDK includes required software libraries, XML schema definitions, and utilities to accelerate development.

When creating an integrated application to QuickBooks, developers may choose from 2 different APIs:

(1) the qbXML Request Processor which requires the developer to create and parse documents written in qbXML; and (2) the QuickBooks Foundation Class (QBFC) Library which is a library of COM objects that implement the qbXML specification. This API eliminates the need to create and parse qbXML directly in the code.

Figure 3:
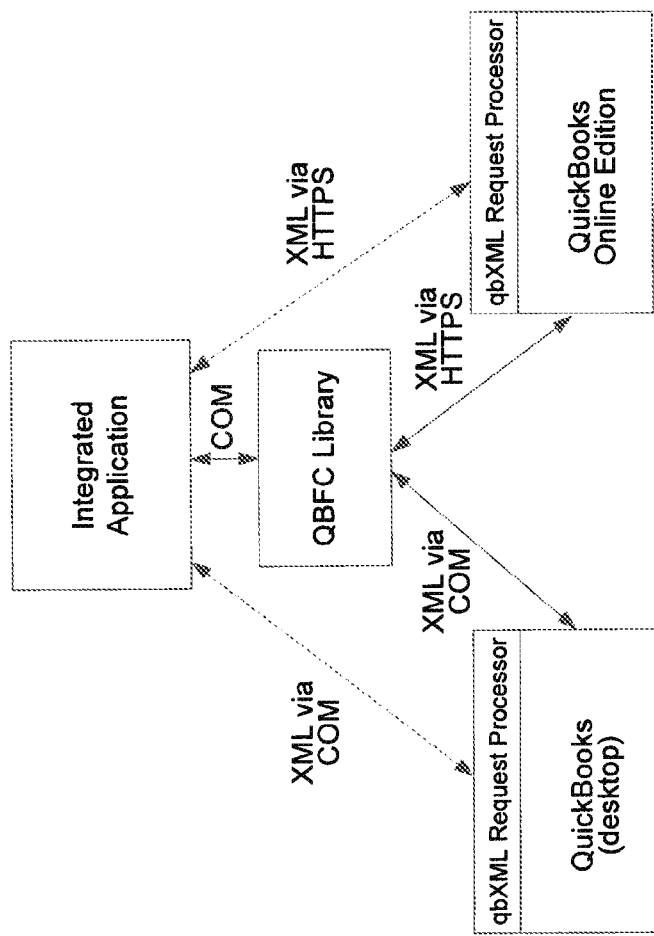
FIGS. 3-13 illustrate various aspects of application and data integration for specific combinations of services according to various embodiments of the invention.

FIG. 3 illustrates the high-level interaction between the two APIs and different versions of QuickBooks. It's important to note that regardless of the QuickBooks version (desktop or online) the only difference is communication protocol.

Figure 4:
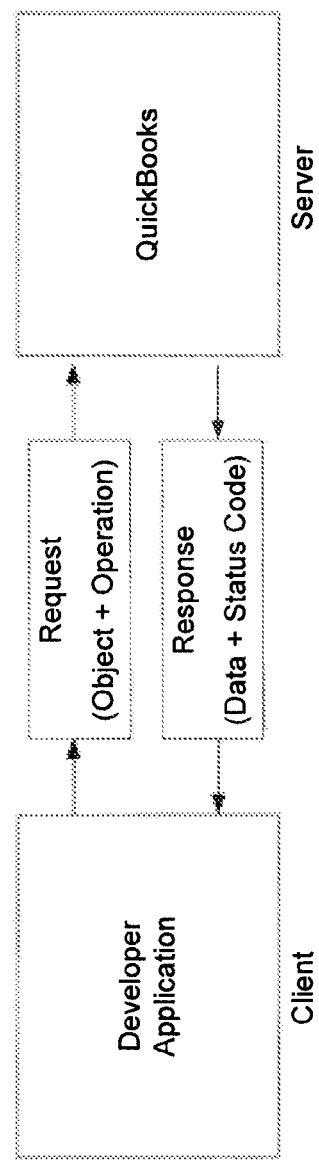

Basic communication to QuickBooks is based on a client/server model shown in FIG. 4. The application sends a "request message" to QuickBooks, and QuickBooks sends back a response message. There is a one-to-one correspondence between request and response messages.

The qbXML Request Processor and QBFC API provides the following COM methods for communications with QuickBooks: (1) OpenConnection, (2) BeginSession, (3) ProcessRequest, (4) EndSession, and (5) CloseConnection.

Integrating via the qbXML Request Processor requires the construction of a qbXML document. qbXML follows normal XML convention with the definition of elements and attributes. A qbXML document must include the name of the QuickBook Object, QuickBook Operation and request data in the body of the XML document. With a properly constructed qbXML document, the qbXML Request Processor will initiate the call to QuickBooks.

QuickBook Objects are used when making requests to QuickBooks. Objects are divided into two categories: lists and transactions. Lists correspond to lists of information (i.e. Account List, Entity List, etc. . . . ). Transactions correspond to basic accounting entities (i.e. Accounts Receivable Transactions, Sales Receipts, etc. . . . ).

Whereas the Objects are the nouns of the request, an Operation is the verb. QuickBooks supports 5 Operations: Query, Add, Modify, Delete, and Void.

In addition to specifying an Object and Operation, a qbXML request document must be included as part of the request. Listed below is a sample qbXML request document that adds a customer to QuickBooks:

```
<?xml version="1.0"?>
<?qbxml version="3.0"?>
<QBXML>
    <QBXMLMsgsRq onError="StopOnError">
        <CustomerAddRq requestID = "1">
            <CustomerAdd>
                <Name>Sally Smith</Name>
                <FirstName>Sally</FirstName>
                <LastName>Smith</LastName>
                <Phone>123-2345</Phone>
            </CustomerAdd>
        </CustomerAddRq>
    </QBXMLMsgsRq>
</QBXML>
```

In the above example a Customer Object is used in conjunction with the Add operation. The corresponding qbXML response document to this request is:

```
<?xml version="1.0"?>
<QBXML>
<QBXMLMsgsRs>
    <CustomerAddRs requestID="1" statusCode="0"
```

-continued

```
          statusSeverity="Info"
          statusMessage="Status OK">
      <CustomerRet>
          <ListID>30000-1029522127</ListID>
          <TimeCreated>2003-08-16T11:22:07-08:00
          </TimeCreated>
          <TimeModified>2003-08-16T11:22:07-08:00
          </TimeModified>
          <EditSequence>1029522127</EditSequence>
          <Name>Sally Smith</Name>
          <FullName>Sally Smith</FullName>
          <IsActive>true</IsActive>
          <Sublevel>0</Sublevel>
          <FirstName>Sally</FirstName>
          <LastName>Smith</LastName>
          <Phone>123-2345</Phone>
          <Balance>0.00</Balance>
          <TotalBalance>0.00</TotalBalance>
          <JobStatus>None</JobStatus>
      </CustomerRet>
    </CustomerAddRs>
  </QBXMLMsgsRs>
</QBXML>
```

Unlike the qbXML Request Processor, integration accomplished with the QBFC Library requires no construction and parsing of a qbXML document. QBFC is implemented as a COM library that can be manipulated with various programming languages. The QBFC library: (1) employs standard COM concepts, such as data types (BSTR, long), error handling, and method signatures; (2) Supplies data type objects that provide the ability to enforce the qbXML data types; (3) Matches object and element names to the underlying qbXML specification; and (4) Maintains the request-response model.

The QBFC COM objects are grouped into several categories, namely: (1) Session Management; (2) High-Level Request Information; (3) High-Level Response Information; (4) Message Data; and (5) Data Types. A detailed description of the functionality and implement of all QBFC COM Objects can be found in the QuickBooks SDK, incorporated herein by reference for all purposes.

Integration of QuickBooks to the interoperability network of the present invention is accomplished with a QuickBooks connector. The QuickBooks connector is responsible for managing communication, security, transactions, and data translation with the network. The QuickBooks connecter is able to support synchronous and asynchronous communication to the network. Transformation between 3d party data formats and qbXML is centralized in the network. The connector facilitates Single Sign-on between the interoperability network and QuickBooks. All transactions are managed by the network to guarantee transactional integrity of all business processes.

Integrating to Miva Merchant: Overview

As one of the most popular SMB storefront applications in the marketplace today, Miva Merchant is architected from the ground up for an internet environment. Miva Merchant documents a well-defined application integration framework for integrating and extending the Miva Merchant application.

The Miva Merchant integration framework includes a scripting language, virtual machine, vendor-developed business functions and a well-defined database schema. By creating programs authored in the Miva Script Language, developers can rapidly and easily integrate the Miva Merchant suite to 3rd party applications. The Miva Virtual Machine acts as a run-time environment for the custom programs. When interacting with Miva Merchant Data, developers have the option of interacting directly with the database or through the vendor-developed business functions, Miva Database Functions.

Miva Script is a server-side scripting language that is implemented by the Miva Virtual Machine. Miva Script is based on XML tags corresponding to typical programming language constructs such as assignment statements, conditional expressions, loops and input/output statements. Listed below is a sample snippet of a Miva Script:

```
<MvFUNCTION NAME = "ShippingModule_Description"
PARAMETERS = "data" STANDARDOUTPUTLEVEL = "">
    <MvASSIGN NAME = "l.name" VALUE = "">
    <MvIF EXPR = "{ UPS_Open_Store( ) }">
        <MvIF EXPR = "{ UPSMethod_Find_Code ( l.data ) }">
            <MvASSIGN NAME = "l.name" VALUE = "{
'UPS ' $ UPSMethods.d.name }">
        </MvIF>
        <MvASSIGN NAME = "l.ok" VALUE = "{
UPS_Close_Store ( ) }">
    </MvIF>
    <MvFUNCTIONRETURN VALUE = "{ l.name }">
</MvFUNCTION>
```

Miva Script programs are compiled by the Miva Script Compiler, then run under the Miva Virtual Machine.

Extending functionality of the Miva Merchant Suite is accomplished through Miva Modules. Miva Modules are self-contained programs that developers create to supply additional functionality to the Miva Merchant Suite. A Miva Module is programmed using Miva Script and contains a set of Miva Functions. There are 13 types of Miva Modules and each type requires specific Miva Functions to be implemented. The 13 types of Miva Modules are listed below:

| Module Type | Description |
| --- | --- |
| BATCHREPORT | Batch Order Reporting |
| CURRENCY | Currency |
| EXPORT | Data Export |
| FULFILLMENT | Fulfillment |
| IMPORT | Data Import |
| LOG | Logging |
| PAYMENT | Payment Processing |
| SHIPPING | Shipping |
| STOREUTIL | Store Utility |
| SYSTEM | System Extension |
| TAX | Tax |
| UI | User Interface |
| STOREWIZARD | Wizard in a Store |
| WIZARD | Wizard at Domain |

A custom Miva Module is created by extending one of the standard modules listed above. For example, a SalesforceExport Module would extend the Miva EXPORT module. This Module would be programmed in Miva Script and implement the required functions for an EXPORT module.

In addition to interacting with the Database directly, developers may also use the pre-packaged Miva Database Functions. The Miva Database Functions are a set of well-tested and pre-defined Miva Functions for common database tasks such as finding data and reading/writing data. The Miva Database Functions are incorporated in custom Miva Modules. Listed below is the current set of Miva Database Functions:

Administration
Affiliate
Attribute
Attribute Template
Availability Group
Basket
Batch
Category
Country Customer
Domain
Encryption
Group
Inventory
Keys
Miva Mailer
Module
Notifications
Option
Order
Price Group
Privilege
Product
Provisioning
Related Products
State
Statistics
Store
Tasks
Upsell
User
Utility Interacting with the Miva database directly is accomplished through Miva Script. The Miva Script language defines a syntactic language for manipulating data with the Miva database.

The recommended practice for integrating a Miva Merchant application with external systems is via a Miva Script Commerce Library. A Miva Script Commerce Library is an extension of the Miva Script language. The Miva Script Commerce Library acts as a communication link between an external system and a Miva Script. The Library is written in the C programming language.

Miva provides a well defined API for creating custom Miva Script Commerce Libraries. The APIs define functional interfaces which must be implemented by the developer to create a custom Commerce Library. The interfaces may be broken down into four categories: memory allocation, variable manipulation, networking and file. In addition to handling connectivity to an external system, it is recommend that all data normalization be handled by the Commerce Library. Examples of custom Commerce Libraries developed in the past have integrated Miva Merchant with Payment Gateways (i.e. PayPal, Authorize.net, etc. . . . ), Finanical Packages (i.e. Quickbooks, Great Plains, etc. . . . ) and Trading Networks (i.e. Ariba, Commerce One, etc. . . . ).

Integrating Miva Merchant to the interoperability network of the present invention involves the creation of a Grand Central Miva Merchant Module (GCMM). The GCMM is responsible for managing connectivity, security, and transactions with the network. For connectivity, the GCMM exposes a WSDL for the network to register as an endpoint. In addition, the GCMM is able to interact with the network in a synchronous or asynchronous fashion. The security required to enable single sign-on is managed by the network. For cases when transaction context is important to the business process, the GCMM manages the coordination of the transactional process.

PayPal Application Integration: Overview

Most PayPal members currently use the PayPal website to manage their PayPal transactions. Members additionally can use PayPal merchant tools, such as PayPal Shopping Cart and Instant Payment Notification, for more advanced payment functions.

PayPal now extends this flexibility with the introduction of PayPal API. The API is based on web services standards, such as SOAP and WSDL. PayPal merchants can use web services technology to create applications that work directly and automatically with PayPal. PayPal API calls can automate certain PayPal functions that normally would require a person to manually enter information. For example, the PayPal Refund API allows merchants to automate refunds to buyers. This is especially useful for large merchants who make hundreds of refunds each month. PayPal API calls are accessible by qualified Business and Premier accounts.

Currently, PayPal provides two API calls: RefundTransaction and GetTransactionDetails. More API calls for bulk processing will be available soon.

In addition to the API, PayPal can also send payment alerts called Instant Payment Notifications (IPNs) to applications when a payment has been made on PayPal. Grand Central has implemented an IPN handler that can accept an IPN, validate with PayPal that the IPN is a genuine IPN (not a spoof message), and trigger the next step in the business process (e.g. shipping, packaging, etc.)

Employease Application Integration: Overview

Figure 5:
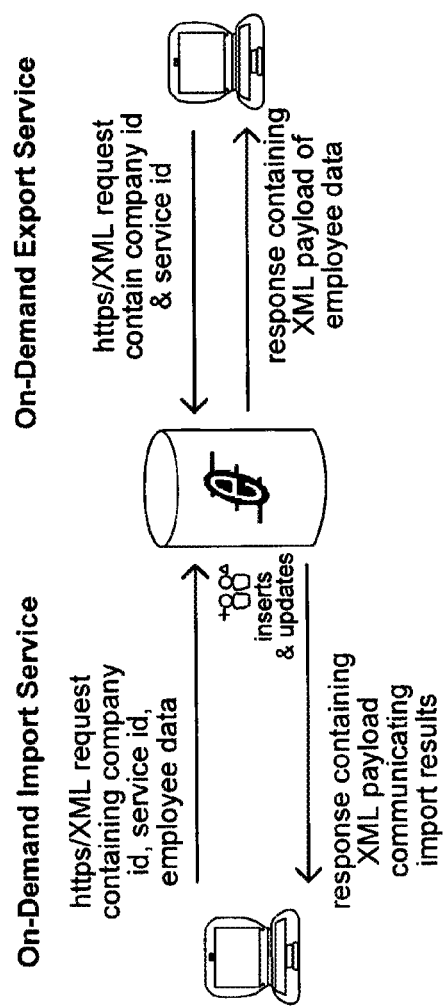

Employease supports application integration through the Employease WebAPI, a web services toolkit supporting SOAP, XML, HR-XML and ebXML. The WebAPI provides On-Demand services (import and export) for the exchange of information over HTTPS as illustrated in FIG. 5.

Employease On-Demand sevices can be used by applications external to the Employease Network (EN) to create new and modify existing employee records in the EN. Multiple services have been created and each is limited to specific transaction types. The table below defines the employee provisioning services that are currently available.

| Service Name | Description |
| --- | --- |
| EmployeeImport | The EmployeeImport service either inserts a new employee record into the EN or updates an existing record in the EN. The EmployeeImport service is responsible for determining the type of transaction that is executed. |
| EmployeeInsert | The EmployeeInsert service inserts a new employee record in the EN. If a duplicate record is submitted by the requesting application the record is rejected. |

Each of the employee provisioning web services supports multiple types of employee data including demographic, work, earnings and user information.

Employease web services are based upon the Employease Automated Exchange Architecture and messaging specification EConnectXML, an extension of ebXML.

The ebXML specification allows for a variety of message processing scenarios—from asynchronous where the requests, replies, and acknowledgements are sent over separate channels—to synchronous messaging where all operations are carried over a single HTTPS connections. In this specification, messaging is conducted over HTTPS. The Request sent by the MP and the Response returned by EConnectXML is all handled on a single HTTPS Post method. The diagram below illustrates the message processing involved. The MP executes a HTTPS POST method with the necessary ebXML MIME structure and EConnectXML responds with an ebXML Response message over the same HTTPS connection.

Figure 6:
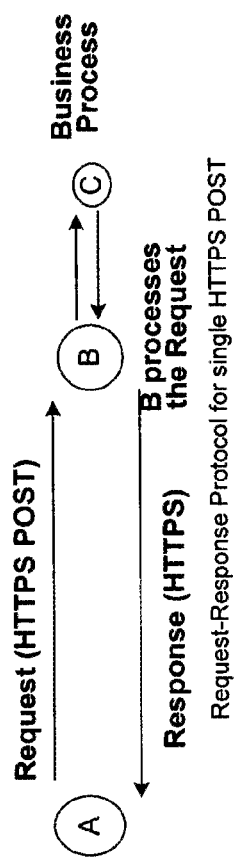

FIG. 6 illustrates the steps in the protocol involved in a Request-Response interaction. More specifically, an EConnectXML transaction between A and B is shown in which A represents the Messaging Partner (MP) accessing a Business Process (BP), B—represents EConnectXML, and C—represents Business Process (BP) executed by EConnectXML. As shown, (1) A initiates an HTTPS/1.1 connection with B on a predetermined URL (https://home.eease.com/EConnectXML) that represents B's address. (2) A uses the HTTPS connection to send the EConnectXML message as a POST operation. (3) A waits for a response to the message to be returned in the HTTP stream. (4) B has an HTTPS/1.1-complaint server that dispatches the HTTPS Request to the resource specified by the URL used in (1). (5) B's resource identified in (4) reads the EConnectXML message contents, maps the Request to the appropriate handler for further processing. (6) An appropriate Business Process (C) is initiated based on the Request. (7) B's Business Process (C) performs the work that the Request specifies and sends the required information back in an ebXML message. (8) B sends the Response to A through the HTTPS connection established in (1). (9) A reads the Response and returns it to the process that initiated the Request. (10) A closes the HTTPS connection established in (1).

Figure 7:
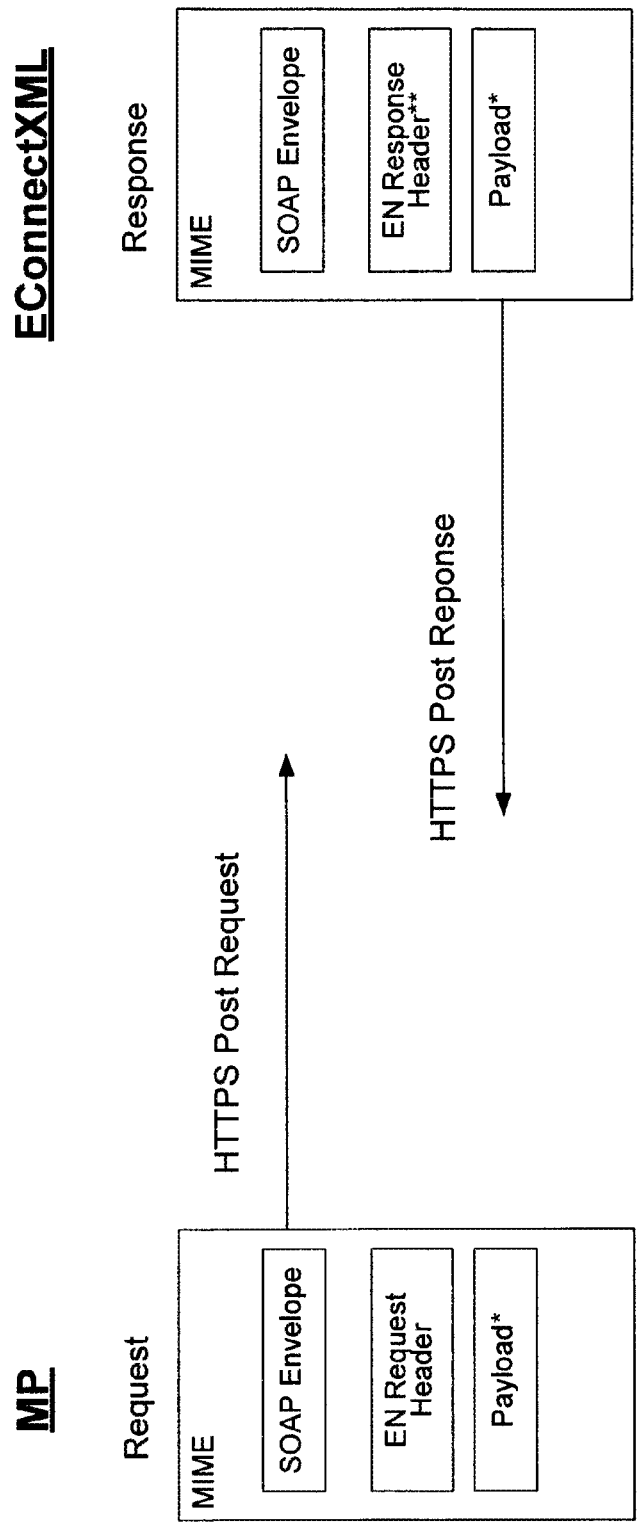

This process is then repeated for further Request/Response cycles. FIG. 7 shows the possible contents of the ebXML Request and Response. As shown, the entire business process is encapsulated within a single HTTPS method. The MP waits on the HTTPS Post for a response to be returned from EConnectXML. Appropriate timeout constraints must be accounted for on both sides of the HTTPS connection. EConnectXML has a default timeout of 30 minutes.

This messaging structure allows for a variety of business processes to be supported:

1) Document/Data export type business processes where the Messaging Partner is requesting payload to be returned. A document of arbitrary size can be returned. It can be XML, ASCII, or potentially other formats.

2) Document/Data import type business processes where the MP is sending a payload document of arbitrary size for consumption by EConnectXML.

3) Simple method invocation type operations. In this mode the payloads in the Request and Response function as arguments and return values respectively.

Every unique business process supported and published to an MP by EConnectXML has a defined ebXML MIME structure that must conform to a Request and Response signature as depicted in the diagram above.

Salesforce.com Application Integration: Overview

Salesforce.com enables customers who have subscribed to the Enterprise Edition of their CRM system to access and manage their data through the sforce SOAP API. The latest version is 3.0. The sforce API calls represent specific operations that client applications can invoke at run-time to perform certain tasks. For example, one can query an organization's data; add, update, and delete information; obtain metadata about the organization's data; and run utilities to perform administration tasks.

The client application prepares and submits a service request to the sforce Web service, the sforce Web service processes the request and returns a response, and the client application handles the response as appropriate. Once the API call is invoked, the client application waits until it receives a response from the service. Asynchronous calls are not supported. Every operation that writes to a salesforce.com table is committed automatically. This is analogous to the AUTO-COMMMIT setting in SQL. For create, update, and delete calls that attempt to write to multiple rows in a table, the write operation for each row is treated as a separate transaction. For example, if a client application attempts to create two new accounts, they're created using mutually exclusive insert operations that succeed or fail individually, not as a group.

For each sforce API call, a client application typically: (1) Prepares the request by defining request parameters, if applicable; (2) Invokes the call, which passes the request with its parameters to the sforce Web service for processing; (3) Receives the response (synchronously) from the sforce Web service; and (4) Handles the response, either by processing the returned data (for a successful invocation) or by handling the error (for a failed invocation).

In order to embed sforce API calls in a larger process, there is a requirement for a component to handle this login and session management. The interoperability network creates a process wrapper for the sforce API that serves this purpose. The client only needs to authenticate to the network and submit a request to the process, which then logs in using the appropriate SFDC credential, obtains a session, and makes the relevant call.

Another interesting feature of the sforce API is that the login operation redirects a client from the SOAP server published in the WSDL file to a geographic back-end server for subsequent operations. The interoperability network's process wrapper can handle that redirect transparently, so that the client doesn't need to know that any redirect is taking place.

According to a specific embodiment, the sforce API calls shown in the following table are supported:

| Supported Calls in the sforce API | |
|---|---|
| Task/Call | Description |
| Create | Adds one or more new individual objects to your organization's data. |
| Delete | Deletes one or more individual objects from your organization's data. |
| describeGlobal | Retrieves a list of available objects for your organization's data. |
| describeSObject | Retrieves metadata (field list and object properties) for the specified object type. |
| GetDeleted | Retrieves the IDs of individual objects of the specified object that have been deleted since the specified time. |
| getServerTimestamp | Retrieves the current system timestamp (GMT) from the sforce Web service. |
| getUpdated | Retrieves the IDs of individual objects of the specified object that have been updated since the specified time. |
| getUserInfo | Retrieves personal information for the user associated with the current session. |
| Login | Logs in to the sforce single sign-on server and starts a client session. |
| Query | Executes a query against the specified object and returns data that matches the specified criteria. |
| QueryMore | Retrieves the next batch of objects from a query. |

-continued

Supported Calls in the sforce API

| Task/Call | Description |
| --- | --- |
| resetPassword | Changes a user's password to a server-generated value. |
| Retrieve | Retrieves one or more objects based on the specified object IDs. |
| Search | Executes a text search in your organization's data. |
| setPassword | Sets the specified user's password to the specified value. |
| Update | Updates one or more existing objects in your organization's data. |

ADP Pay eXpert Application Integration: Overview

ADP Pay eXpert supports application integration through importing of employee data and pay data. If employee data is created using an external source, such as a human resources system (e.g., Employease), the data can be imported into the Pay eXpert® database without rekeying the data. After importing the employee data, the data can be treated like any other data that were entered directly into Pay eXpert. The employee data that is imported must be in an ADP-specified format, and assigned an ADP-specified filename. According to specific embodiments, the importing of Employease employee data into ADP is automated using HTTPS/FTP gateways. According to a more specific embodiment, this employee data import can become a routine part of every payroll cycle.

Pay eXpert supports importing data files prepared in the comma separated value (CSV) file format. There are many products, such as Microsoft Excel, dBASE, and FoxPro that can help prepare a file in CSV format. A CSV file can also be prepared using a basic text editor. Each employee data import file comprises multiple records, where a record is one line of data in the file. The items in a record are separated from each other by a comma or tab. The end of a record is indicated by a carriage return and line feed. An employee data import file must contain at least two types of records: Header and Data. Similarly, pay/salary data can be imported into ADP Pay expert using CSV files.

The details of integrating the data associated with each of the applications or services mentioned above are described below. It should again be noted that these descriptions are provided for exemplary purposes only, and that the present invention is not limited to the identified services, applications, or integration techniques.

QuickBooks Data Integration Overview

Developing integration to QuickBooks requires an understanding of the QuickBooks data format. Since all data interactions with QuickBooks may be transformed to qbXML, integrating the qbXML data format to other $3^{rd}$ party data formats may be accomplished by using common XML transformation technology such as XSL style sheets.

MIVA Data Integration Overview

Developing integration to the Miva Merchant suite requires an understanding of the Miva Merchant Data Format. Since all interactions with the Miva Merchant Database is accomplished through the XML-based Miva Script language, all inputs and outputs to the Miva Merchant Database are performed through an XML data format.

The Miva Merchant Database Schema is available for viewing over the internet (http://www.miva.com/docs/api/db_HTML/MMdb4x.html). Because the database schema is well understood and all interactions with the database are accomplished through XML, transforming results to a different XML Schema is executed with an XSL style sheet.

PayPal Data Integration Overview

Figure 8:
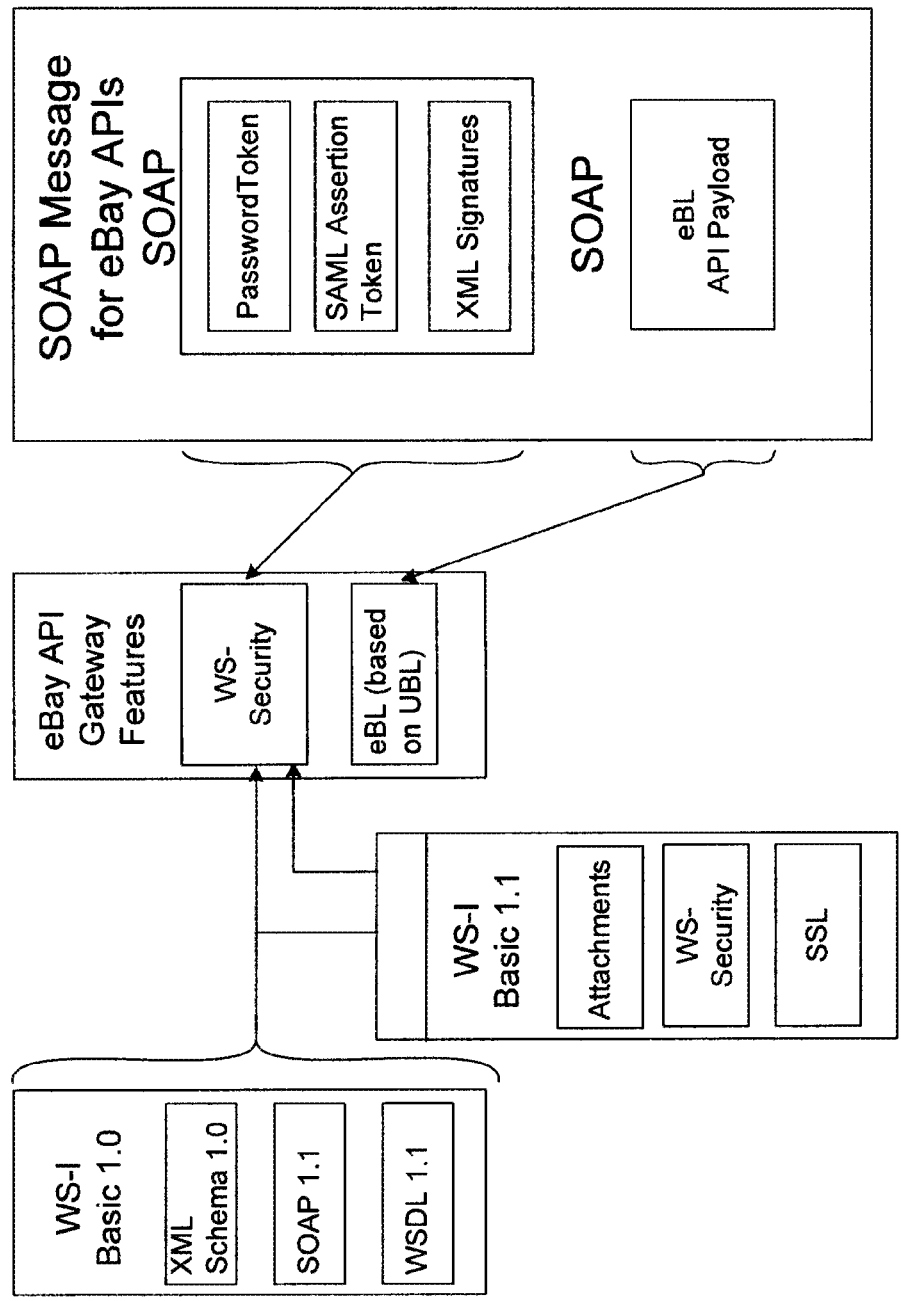

For data integration, PayPal publishes an eBL/PayPal schema. The eBL schema library leverages existing business component schema models such as Universal Business Language (UBL), ebXML, and EDI to re-use and customize common industry definitions of core business message components to meet specific business needs of eBay applications such as buying, selling, payment, cataloguing, and product search. FIG. 8 illustrates what needs to go into the SOAP envelope. Approval is implicit in the response.

The PayPal Refund API is Built upon the Following eBL Schema:

AbstractRequestType—Base type definition of request payload that can carry any type of payload content with optional versioning information and detail level requirements.

AbstractResponseType—Base type definition of a response payload that can carry any type of payload content with following optional elements: (1) The timestamp of the response message; (2) An application level acknowledgement; and (3) Application-level errors and warnings.

Data integration with PayPal requires contructing AbstractRequestType messages and parsing AbstractResponsetType messages based on the eBL/PayPal schema.

Employease Data Integration Overview

For Employease, employee synchronization data is transmitted in an XML file format developed by Employease. Version 1.0 supports the standard PersonName and PostalAddress objects approved by the HR-XML Consortium. Future releases will strive to incorporate additional HR-XML industry standards as they become available. Employee synchronization currently supports three transaction types: Insert, Update and Delete.

```
<EmployeeSynchronization>
    <InsertEE></InsertEE>
    <UpdateEE></UpdateEE>
    <DeleteEE></DeleteEE>
</EmployeeSynchronization>
```

Each Employee Synchronization transaction shares a common element, a 'Key', that is used to uniquely identify each individual employee in the Employease Network. In addition, the Insert and Update transactions share a common set of fields that are always sent with each individual transaction.

Figure 9:
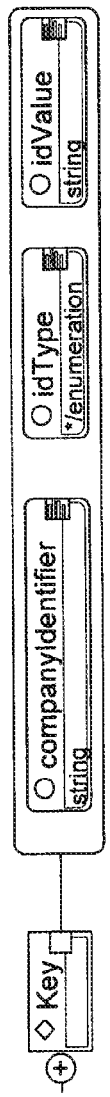
Figure 10:
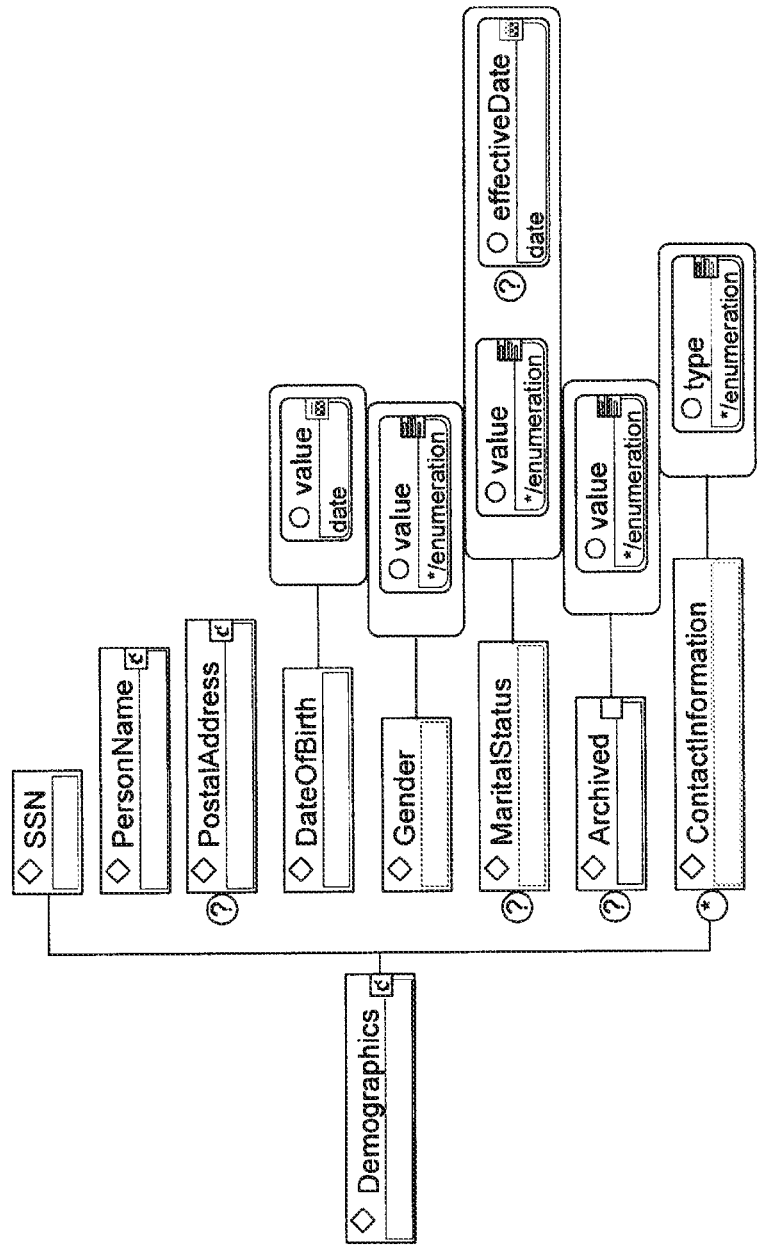
Figure 11:
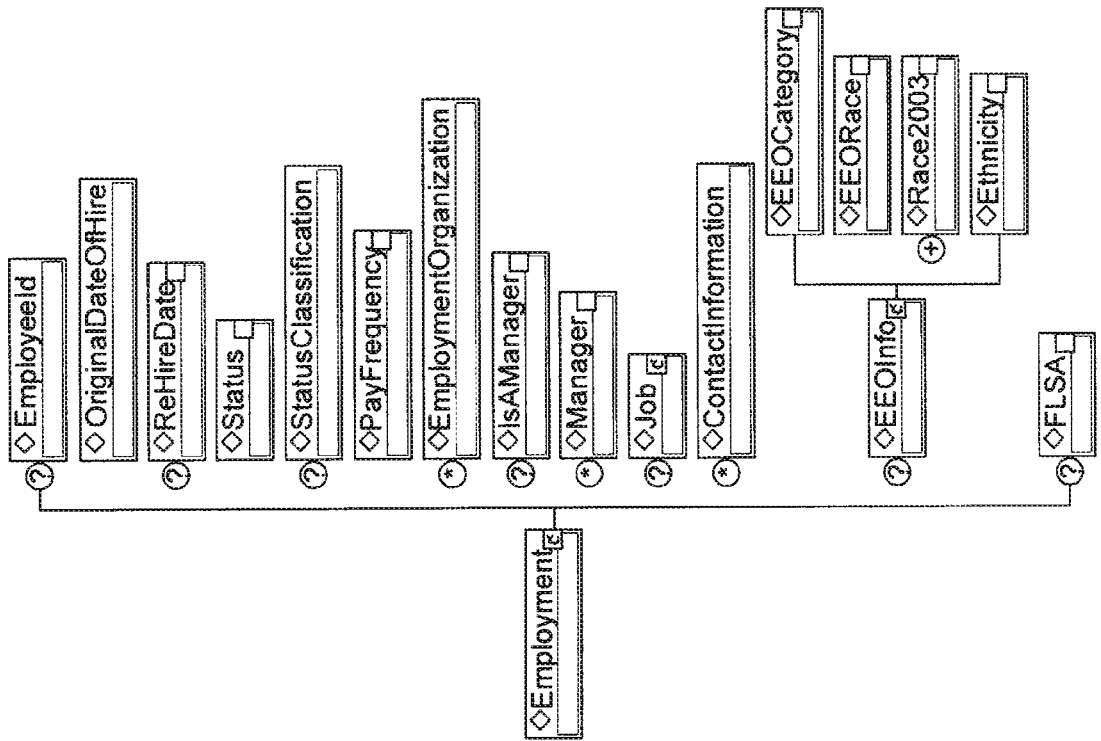
Figure 12:
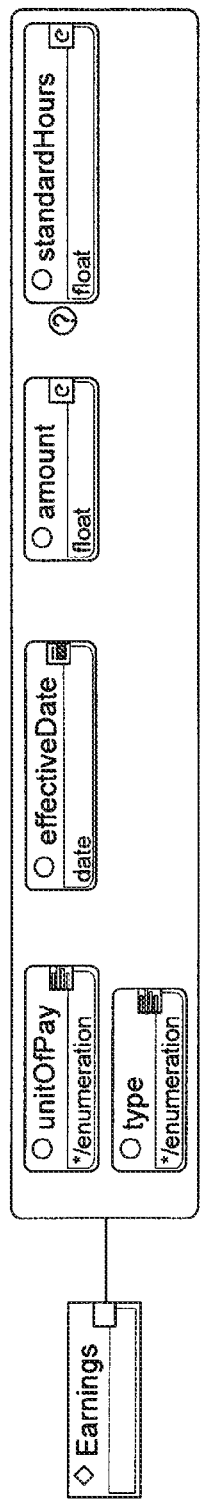

FIGS. 9-12 illustrate some samples of the request/reply objects. FIG. 9 shows an example of the Key referred to above. FIG. 10 shows an exemplary Demographics object. FIG. 11 shows an exemplary Employment object. FIG. 12 shows an exemplary Earnings object.

For data integration with external applications such as ADP Pay eXpert, a mapping software such as Contivo can be used to normalize and transform the Employease XML format into ADP-compliant CSV file format.

Salesforce.com Data Integration Overview

For data integration, the sforce SOAP API uses its own XML data format. The latest version of the published schema is sforce API 3.0. In the sforce API, objects are data entities that represent an organization's information. For example, the Account object represents accounts-companies and organizations involved with a business, such as customers, partners, and competitors. To describe a particular occurrence of an object (such as a specific account that is represented by an Account object), sforce uses the term object instance. An object instance is analagous to a row in a database table.

According to a specific embodiment, the Salesforce.com objects shown in the following table are supported:

| \multicolumn{2}{c}{List of Supported salesforce.com Objects} | |
|---|---|
| Object | Description |
| Account | Represents an individual account, which is an organization involved with your business (such as customers, competitors, and partners). |
| AccountShare | Represents a sharing entry on an Account. |
| AccountTeamMember | Represents a User who is a member of an Account team. |
| Attachment | Represents a file that a User has uploaded and attached to a parent object. |
| BusinessProcess | Represents a business process. |
| Campaign | Represents and tracks a marketing campaign, such as a direct mail promotion, webinar, or trade show. |
| CampaignMember | Represents the association between a Campaign and either a Lead or Contact. |
| Case | Represents a case, which is a customer issue such as a customer's feedback, problem, or question. |
| CaseComment | Represents a comment that provides additional information about the associated Case. |
| CaseHistory | Represents historical information about changes that have been made to the associated Case. |
| CaseSolution | Represents the association between a particular Case and a particular Solution. |
| CaseStatus | Represents the status of a Case, such as New, On hold, In Process, and so on. |
| Contact | Represents a contact, which is an individual associated with your Accounts. |
| Contract | Represents a contract (a business agreement) associated with an Account. |
| ContractStatus | Represents the status of a Contract, such as Draft, InApproval, Activated, Terminated, or Expired. |
| CurreneyType | Represents the currencies used by an organization for which the multi-currency feature is enabled. |
| Document | Represents a file that a user has uploaded. Unlike Attachment objects, Documents are not attached to a parent object. |
| Event | Represents a calendar appointment event. |
| Folder | Represents a repository for a Document, MailMergeTemplate, email template, or report. Only one type of item can be contained in a particular Folder. |
| Group | Represents a set of Users. |
| GroupMember | Represents a User or Group that is a member of a public group. |
| Lead | Represents a lead, which is a prospect or potential Opportunity. |
| LeadStatus | Represents the status of a Lead, such as Open, Qualified, or Converted. |
| MailMergeTemplate | Represents a mail merge template (a Microsoft Word document) used for performing mail merges for your organization. |
| Note | Represents a note, which is text associated with an Attachment, Contact, or Opportunity. |
| Opportunity | Represents an opportunity, which is a sale or pending deal. |
| OpportunityCompetitor | Represents a competitor on an Opportunity. |
| OpportunityContactRole | Represents the association between an Opportunity and a Contact, with a specified Role name applied to the contact. |
| OpportunityLineItem | Represents an opportunity line item, which is a member of the list of Product2s associated with an Opportunity, along with other information about those products on that opportunity. |
| OpportunityLineItemSchedule | Represents information about the quantity, revenue distribution, and delivery dates for a particular OpportunityLineItem. |
| OpportunityShare | Represents a sharing entry on an Opportunity. |
| OpportunityStage | Represents the stage of an Opportunity in the sales pipeline, such as New Lead, Negotiating, Pending, Closed, and so on. |
| OpportunityTeamMember | Represents an individual User on the sales team of a particular Opportunity. |
| Partner | Represents the association between two particular Accounts or between a particular Opportunity and an Account. |
| PartnerRole | Represents a role for an account Partner, such as consultant, supplier, and so on. |
| Pricebook [Deprecated] | Represents a price book that contains the list of Product [Deprecated]s that your organization sells. |
| Pricebook2 | Represents a price book that contains the list of Product2s that your organization sells. |
| PricebookEntry | Represents a product entry (an association between a Pricebook2 and Product2) in a pricebook. |

List of Supported salesforce.com Objects

| Object | Description |
| --- | --- |
| Product [Deprecated] | Represents a product that your organization sells. A product is member of the list of items in a Pricebook [Deprecated]. |
| Product2 | Represents a product that your organization sells. A product is member of the list of items in a Pricebook2. |
| Profile | Represents a profile, which defines a set of permissions to perform different operations, such as querying, adding, updating, or deleting information. |
| RecordType | Represents a record type. |
| Role | Represents a role in your organization. |
| Scontrol | Represents an sforce control, which is custom content that is hosted by the server but executed by client applications. |
| Solution | Represents a solution, which is a detailed description of a customer issue and the resolution of that issue. |
| SolutionStatus | Represents the status of a Solution, such as Draft, Reviewed, and so on. |
| Task | Represents a task. |
| TaskPriority | Represents the priority (importance) of a Task, such as High, Normal, or Low. |
| TaskStatus | Represents the status of a Task, such as Not started, Completed, or Closed. |
| User | Represents a user in your organization. |
| UserTeamMember | Represents a single User on the default sales team of another user. |

Additionally, Salesforce.com provides a sforce Object Query Language (SOQL) and a sforce Object Search Language (SOSL). The sforce Object Query Language (SOQL) is used to construct simple but powerful query strings for the queryString parameter in the query call. Similar to the SELECT command in SQL, SOQL allows you to specify the source object (such as Account), a list of fields to retrieve, and conditions for selecting rows in the source object. The sforce Object Search Language (SOSL) is used to construct simple but powerful text searches for the search call. SOSL allows one to specify the text expression, the scope of fields to search, the list of objects and fields to retrieve, and the maximum number of objects to return.

ADP Pay eXpert Data Integration Overview

Figure 13:
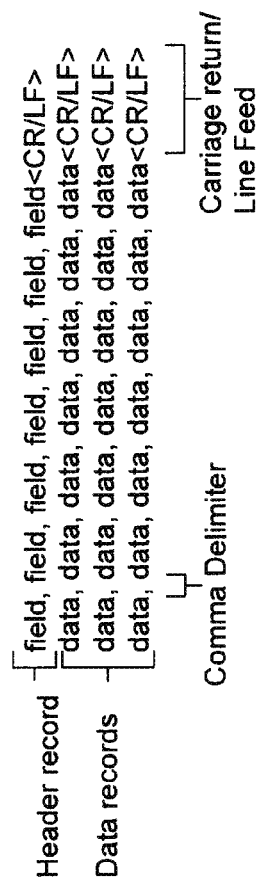

ADP Pay eXpert uses CSV file format for employee and pay data integration. Each employee data import file comprises multiple records, where a record is one line of data in the file. The items in a record are separated from each other by a comma or tab. The end of a record is indicated by a carriage return and line feed. An employee/pay data import file contains at least two types of records, e.g., Header and Data. FIG. 13 shows the components of an employee data import file.

Data Synchronization and Data Flow

For all data sets that need to be persisted a system of record (SOR) is defined. This is typically either where the data ends up or where it is entered into the system. There should never be more than one SOR for any data set as this will lead to confusion and high support costs. The flow of all data entered into the system is managed by the interoperability network. This provides reliable delivery of all transactions between applications, and when an application is unavailable beyond a specific window there is a defined escalation procedure that, if appropriate, will result in human intervention. The key is that even in the event of an error the system is in a known state and there is a defined corrective action.

For Suite 1 (i.e., the eCommerce solution), the SOR is in Quicken, with the interoperability network managing all transactions between MIVA and PayPal to ensure that at any point in time the customer can obtain a unified view of payments and inventory. Payment transactions flow from PayPal to Quicken and similarly refund transactions flow from Quicken to PayPal. Inventory flows from Quicken to MIVA and corresponding sales information flows from MIVA to Quicken.

Suite 2 (i.e., the CRM solution) introduces another SOR to manage sales leads. When leads turn into completed sales the interoperability network manages transactions that update Quicken. Also as new customers that are not in SalesForce come in through MIVA they are added to SalesForce to ensure that the "Lead System" has a complete record of all past and present sales and leads. This is necessary, as the Sales professional will not typically have access to the accounting system, i.e., Quicken. Keeping both systems up to date allows the business to be aligned and operating with current information.

Suite 3, (i.e., the HR solution) adds another SOR for human resource data and other systems to feed this data into and from. The HR system is Employease; this system captures human resource data entered into it. The employee data is transferred on a scheduled basis to ADP for payroll processing and the resulting transaction is routed to QuickBooks to update cash flow. Expense tracking is also available in this suite. The Gelco expense tracking application captures expenses and the workflow around reporting and management. The interoperability network manage the transactions to update the cash flow in QuickBooks and ensures there is a consistent view of the business.

The interoperability network of the present invention also provides web based administrative capabilities that enable an entity having access to the network to monitor, manage and customize its own Business Services Network, including end-to-end visibility, policy and permission management, change management, exception handling and notification, and administration and reporting. The reporting interface is customizable and extensible to enable integration into in-house management tools to provide a single view of the virtual business network.

All messages sent into the interoperability network are uniquely identified and the sender has a receipt sent back to them synchronously to acknowledge receipt of the transaction. Within the receipt is a unique token that is unique for every message. Using this token all parties to the transaction can track and audit the process of any message through the reporting interface.

For entities setting up Business Services Networks to interact with customers, the interoperability network acts as a neutral third party in all interactions, providing the ability for all parties to quickly resolve delivery issues. Rules can be defined around delivery to allow for escalation procedures to be initiated in the cases when messages are unable to be delivered or where they are not responded to within a mutually agreed time window. The interoperability network provides the critical infrastructure to ensure no matter what happens messages are never lost and they are always in a state that is known to all parties in the transaction.

The secure infrastructure of the interoperability network enables companies to safely deploy mission-critical, enterprise class business initiatives while leveraging their existing investments. For example, the interoperability network is configured to ensure that enterprises can manage trusted relationships between many organizations, each with different access, authentication and encryption technologies, without unnecessary exposure of applications behind corporate firewalls. Differences in corporate security policies are handled through a policy framework, which mediates the differences. Each enterprises is in complete control of configuring and enforcing access rights, and multiple methods of authentication are supported.

By acting as a buffer between the world and each enterprise or user, the interoperability network provides added security against direct attacks. By polling for messages from the interoperability network, each enterprise or user does not need to provide in-bound HTTP or HTTPS access through firewalls, allowing each to avoid unnecessary firewall changes.

According to a particular implementation, the underlying security architecture of the interoperability network is based on WS-Policy, an extremely flexible mechanism for companies to mutually govern access to the services deployed on the network. This mechanism ensures that partners exchange data over encrypted connections to network, their identities are verified, and access to each service is limited and controlled. These capabilities are further supported through industry standards such as SSL, IPSEC, VPN's and X.509 digital certificates. The interoperability network is also fully extensible to cover other widely adopted standards.

The interoperability network is built as a highly scalable distributed architecture. The distributed nature of the architecture allows for scaling in multiple dimensions. This ability to scale individual parts of the network independently allows new hardware to be added to meet any performance needs. The network was built from the ground up as a loosely coupled, Service Oriented Architecture (SOA). The complete capabilities of a standards-based integration technology platform are available for the first time in a simple-to-use, self-service, web-based interface, enabling business processes to be rapidly built and deployed in the network. A comprehensive set of services can be woven together to provide the connectivity, security, process execution, policy mediation and visibility required to deploy transactional business processes.

Figure 14:
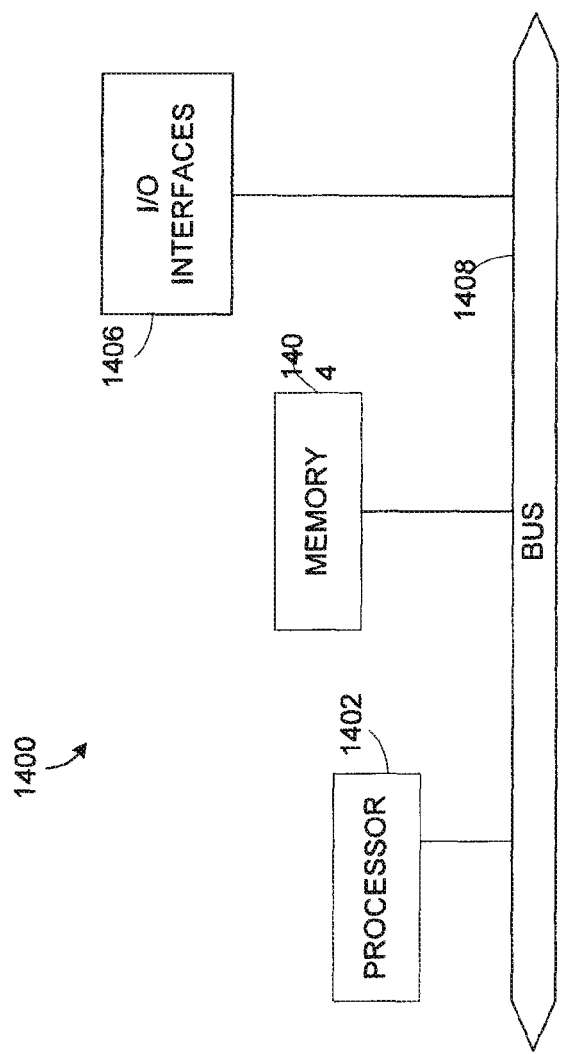
FIG. 14 is a simplified diagram of an exemplary computing device suitable for implementing various aspects of the present invention.

Referring now to FIG. 14, a computer system 1400 suitable for implementing various aspects of the present invention (e.g., server 107 of FIG. 1) includes one or more central processing units (CPUs) 1402, one or more blocks of memory 1404, input and output interfaces 1406, and a bus 1408 (e.g., a PCI bus). Alternatively, computer systems employing point-to-point infrastructures instead of buses may also be employed. When acting under the control of appropriate software or firmware, CPU 1402 is responsible for implementing various portions of the techniques of the present invention. It preferably accomplishes all these functions under the control of software including an operating system and any appropriate applications software. CPU 1402 may include one or more processors. In a specific embodiment, some portion of memory 1404 (such as non-volatile RAM and/or ROM) also forms part of CPU 1402. However, there are many different ways in which memory could be coupled to the system. Memory block 1404 may be used for a variety of purposes such as, for example, caching and/or storing data, program code, etc.

The input and output interfaces 1406 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

It will be understood that the system shown in FIG. 14 is an exemplary computer system and is by no means the only system architecture on which the various aspects of the present invention can be implemented.

Regardless of system's configuration, it may employ one or more memories or memory modules (such as, for example, memory block 1404) configured to store data, program instructions for the general-purpose network operations and/or the inventive techniques described herein. The program instructions may control the operation of an operating system and/or one or more applications, for example. The memory or memories may also be configured to store information in a repository directory.

Because such information and program instructions may be employed to implement the systems/methods described herein, the present invention also relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It should also be noted that, while some of the examples herein are described with reference to SOAP messages, the techniques described herein apply to a wide variety of message formats and protocols including, for example, FTP, EDI, generic HTTP, XML, text files, etc. The invention should therefore not be limited to any specific message format or protocol.

In addition, embodiments of the invention have been described herein with reference to a toolbar interface which facilitates access to the IAS solution. It will be understood, however, that such a toolbar and the various interface described herein are merely exemplary and that the basic functionalities of the present invention may be provided in a wide variety of ways without departing from the scope of the invention. For example, the functionalities of the present invention may be provided through the use of a role-based portal framework running in a user's browser which manages navigation and authentication to the integrated systems of the invention. Such a portal framework is described in U.S. patent application Ser. No. 10/820,650 for TECHNIQUES FOR PROVIDING INTEROPERABILITY AS A SERVICE filed Apr. 7, 2004 (now issued as U.S. Pat. No. 7,590,685), the entire disclosure of which is incorporated herein by reference for all purposes.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An interoperability network for facilitating access to a plurality of composite services by a plurality of users having associated client machines, each of the users being associated with one or more of a plurality of independent enterprises, the interoperability network comprising one or more computing devices that run code to:

provide a business application selection interface for selecting one or more of a plurality of pre-defined business applications, wherein at least some of the pre-defined business applications each comprises a composite service integrating operation of a respective subset of a plurality of services in communication with the interoperability network;

provide a composite service initiation interface for initiating an instance of a first selected one of the composite services, the first selected composite service integrating operation of a first subset of the services, the first subset of services being associated with and controlled by a first plurality of independent service providers;

wherein integrating operation of the first subset of services includes reference to a directory storing access policy information for the plurality of services and using the access policy information to establish access to the first subset of services; and connect with selected ones of the client machines and each of the services in the first subset of the services and selectively facilitate interaction among the selected client machines and the first subset of services, thereby enabling selected ones of the users to access the first selected composite service as an integrated solution in which the first selected composite service facilitates messaging between or among the first subset of services.

2. The network recited in claim 1, the one or more computing devices further running code to:

provide a configuration interface receiving a statement of record for a first one of the selected business applications, the statement of record containing initial information for use with the first business application, the network disseminating at least some portion of the statement of record to one or more services associated with the first business application.

3. The network recited in claim 1, the one or more computing devices further running code to:

provide an identity interface receiving enterprise identity information relating to a first one of the independent enterprises, the network disseminating at least some of the enterprise identity information to the first subset of services.

4. The network recited in claim 3, wherein the identity interface is further receiving user identity information relating to a user associated with the first independent enterprise, the network disseminating at least some of the user identity information to the first subset of services.

5. The network recited in claim 1, the one or more computing devices further running code to:

provide an administration interface providing administration information relating to execution of composite services selected in the business application selection interface, the administration information corresponding to one or more roles associated with a user in communication with the administration interface.

6. The network recited in claim 5, wherein the administration information comprises information selected from the group consisting of: diagnostic reporting information, composite service configuration information, enterprise identity information, user identity information, and historical information relating to previously-executed composite services.

7. The network recited in claim 1, wherein one or more of the interfaces are accessible via a toolbar installed on a web browser, the toolbar providing single sign-on to the first subset of services.

8. The network recited in claim 1, the network further comprising:

at least one data store having a directory stored therein which maps an identity for each of the users to a policy framework which defines access information relating to the plurality of services.

9. The network recited in claim 1, wherein one or more of the first subset of services communicates with the integration services network via a public network.

10. The network recited in claim 1, wherein the first selected composite service is a pre-defined business solution selected from the group consisting of: an eCommerce solution, a customer relationship management (CRM) solution, and a human resource (HR) management solution.

11. A method of facilitating access to a plurality of composite services by a plurality of users having associated client machines in communication with an interoperability network, each of the users being associated with one or more of a plurality of independent enterprises, the method comprising:

receiving, at one or more computing devices on the network, a selection of one or more of a plurality of pre-defined business applications, wherein at least some of the pre-defined business applications each comprises a composite service integrating operation of a respective subset of a plurality of services in communication with the interoperability network;

wherein integration of operation of the respective subset of the plurality of services includes reference to a directory storing access policy information for the plurality of services and using the access policy information to establish access to the subset of services;

receiving, at one or more computing devices on the network, a request to initiate an instance of a first selected one of the composite services, the first selected composite service integrating operation of a first subset of the services, the first subset of services being associated with and controlled by a first plurality of independent service providers; and connecting with selected ones of the client machines and each of the services in the first subset of the services and selectively facilitating interaction among the selected client machines and the first subset of services, thereby enabling selected ones of the users to access the first selected composite service as an integrated solution in which the first selected composite service facilitates messaging between or among the first subset of services.

12. The method recited in claim 11, the method further comprising:

receiving a statement of record for a first one of the selected business applications, the statement of record containing initial information for use with the first business application, the network disseminating at least some portion of the statement of record to one or more services associated with the first business application.

13. The method recited in claim 11, the method further comprising:

receiving enterprise identity information relating to a first one of the independent enterprises, the network disseminating at least some of the enterprise identity information to the first subset of services.

14. The method recited in claim 13, the method further comprising:

receiving user identity information relating to a user associated with the first independent enterprise, the network disseminating at least some of the user identity information to the first subset of services.

15. The method recited in claim 11, the method further comprising:

providing, to one or more of the plurality of users, administration information relating to execution of composite services selected in the business application selection interface, the administration information corresponding to one or more roles associated with a user in communication with the administration interface.

16. The method recited in claim 15, wherein the administration information comprises information selected from the group consisting of: diagnostic reporting information, composite service configuration information, enterprise identity information, user identity information, and historical information relating to previously-executed composite services.

17. The method recited in claim 11, wherein one or more of the first subset of services communicates with the integration services network via a public network.

18. The method recited in claim 11, wherein the first selected composite service is a pre-defined business solution selected from the group consisting of: an eCommerce solution, a customer relationship management (CRM) solution, and a human resource (HR) management solution.

19. A computer program product comprising at least one non-transitory computer-readable storage medium storing instructions for facilitating access to a plurality of composite services by a plurality of users having associated client machines in communication with an interoperability network, each of the users being associated with one or more of a plurality of independent enterprises, the instructions comprising:

first instructions for receiving, at one or more computing devices on the network, a selection of one or more of a plurality of pre-defined business applications, wherein at least some of the pre-defined business applications each comprises a composite service integrating operation of a respective subset of a plurality of services in communication with the interoperability network;

second instructions for receiving, at one or more computing devices on the network, a request to initiate an instance of a first selected one of the composite services, the first selected composite service integrating operation of a first subset of the services, the first subset of services being associated with and controlled by a first plurality of independent service providers;

wherein integration of operation of the respective subset of the plurality of services includes reference to a directory storing access policy information for the plurality of services and using the access policy information to establish access to the subset of services; and third instructions for connecting with selected ones of the client machines and each of the services in the first subset of the services and selectively facilitating interaction among the selected client machines and the first subset of services, thereby enabling selected ones of the users to access the first selected composite service as an integrated solution in which the first selected composite service facilitates messaging between or among the first subset of services.

20. The computer program product recited in claim 19, the computer program product further comprising:

fourth instructions for receiving a statement of record for a first one of the selected business applications, the statement of record containing initial information for use with the first business application, the network disseminating at least some portion of the statement of record to one or more services associated with the first business application.

21. The computer program product recited in claim 19, the computer program product further comprising:

fourth instructions for receiving enterprise identity information relating to a first one of the independent enterprises, the network disseminating at least some of the enterprise identity information to the first subset of services.

22. The computer program product recited in claim 19, the computer program product further comprising:

fourth instructions for receiving user identity information relating to a user associated with the first independent enterprise, the network disseminating at least some of the user identity information to the first subset of services.

23. The computer program product recited in claim 19, the computer program product further comprising:

fourth instructions for providing, to one or more of the plurality of users, administration information relating to execution of composite services selected in the business application selection interface, the administration information corresponding to one or more roles associated with a user in communication with the administration interface.

* * * * *